(12) United States Patent
Wong

(10) Patent No.: US 10,012,399 B2
(45) Date of Patent: Jul. 3, 2018

(54) WINDOW-TYPE AIR CONDITIONING SYSTEM WITH WATER COOLING UNIT

(71) Applicant: Lee Wa Wong, Pico Rivera, CA (US)

(72) Inventor: Lee Wa Wong, Pico Rivera, CA (US)

( * ) Notice: Subject to any disclaimer, the term of this patent is extended or adjusted under 35 U.S.C. 154(b) by 849 days.

(21) Appl. No.: 14/534,576

(22) Filed: Nov. 6, 2014

(65) Prior Publication Data

US 2016/0131370 A1   May 12, 2016

(51) Int. Cl.
*F24F 1/02* (2011.01)
*F24F 5/00* (2006.01)

(52) U.S. Cl.
CPC ............ *F24F 1/027* (2013.01); *F24F 5/0003* (2013.01); *F24F 5/0035* (2013.01)

(58) Field of Classification Search
CPC ........ F24F 1/027; F24F 5/0003; F24F 5/0035; F24F 5/035
USPC ......................................................... 454/201
See application file for complete search history.

(56) References Cited

U.S. PATENT DOCUMENTS

| | | | |
|---|---|---|---|
| 4,112,027 A | 9/1978 | Cates | |
| 4,478,275 A * | 10/1984 | Ernst | F28D 15/02 165/104.27 |
| 6,311,028 B1 * | 10/2001 | Matsudaira | G03G 15/2039 219/216 |
| 6,418,728 B1 * | 7/2002 | Monroe | F24F 5/0035 62/3.2 |
| 6,434,963 B1 * | 8/2002 | Urch | F24F 1/022 165/54 |
| 6,595,011 B1 * | 7/2003 | Forgy | F24F 5/0035 62/305 |
| 9,739,491 B2 * | 8/2017 | Beermann | F24F 1/027 |
| 2002/0145209 A1 * | 10/2002 | Litz | B60H 1/3202 261/26 |
| 2006/0010896 A1 * | 1/2006 | Choi | F24F 13/20 62/262 |
| 2007/0028637 A1 * | 2/2007 | Eom | F24F 1/027 62/262 |
| 2007/0130980 A1 * | 6/2007 | Han | F24F 1/0011 62/262 |
| 2007/0251255 A1 | 11/2007 | Eom et al. | |
| 2011/0120167 A1 * | 5/2011 | Lingrey | F24F 1/027 62/324.4 |
| 2013/0047641 A1 | 2/2013 | Townsend et al. | |

(Continued)

*Primary Examiner* — Steven B McAllister
*Assistant Examiner* — Allen Schult
(74) *Attorney, Agent, or Firm* — Tsz Lung Yeung

(57) ABSTRACT

A window-type air conditioning system includes an outer housing having an indoor compartment, an outdoor compartment, and a water tank, a fan assembly, a compressor unit, an evaporator unit, and a water cooling unit. The water cooling unit includes a pumping device provided in the water tank, a top water collection basin for collecting the cooling water from the pumping device, a fill material unit provided underneath the top water collection basin, a bottom water collection basin provided underneath the fill material unit, and at least one heat exchanging pipe immersed in the cooling water. The cooling water collected in the bottom water collection tank is arranged to be guided to flow back into the top water collection basin, while a predetermined amount of refrigerant is arranged to flow through the heat exchanging pipe for performing heat exchanging process with the cooling water.

19 Claims, 25 Drawing Sheets

(56) References Cited

U.S. PATENT DOCUMENTS

| | | | |
|---|---|---|---|
| 2013/0160977 A1* | 6/2013 | Fan | F28D 15/04 165/104.26 |
| 2015/0276240 A1* | 10/2015 | Shimamoto | F25B 13/00 165/218 |
| 2016/0109143 A1* | 4/2016 | Kogan | F24F 3/1429 62/94 |

* cited by examiner

WINDOW-TYPE AIR CONDITIONING SYSTEM WITH WATER COOLING UNIT

BACKGROUND OF THE PRESENT INVENTION

Field of Invention

The present invention relates to an air conditioning system, and more particularly to a window-type air conditioning comprising a water cooling unit which utilizes water as a cooling agent.

Description of Related Arts

Window-type air conditioning systems have been widely utilized all over the world. Referring to FIG. 1 to FIG. 3 of the drawings, a conventional window-type air conditioning system is illustrated. The conventional window-type air conditioning system comprises an outer housing 10P having an outdoor air inlet 11P, an air outlet 12P, a control panel 13P, an indoor air inlet 14P, and a frontal frame 15P. The outer housing 10P has an indoor compartment 101P and an outdoor compartment 102P partitioned by a divider 103P having a passage slot 1031P and a passage valve 1032P.

The conventional window-type air conditioning system further comprises a compressor unit 16P, an indoor heat exchanger 17P acted as an evaporator unit, an outdoor heat exchanger 18P acted as an condenser unit, a fan driving unit 19P arranged to drive a centrifugal fan 191P located in the indoor compartment 101P, and an axial fan 192P located in the outdoor compartment 102P.

As shown in FIG. 3 of the drawings, the superheated or vaporous refrigerant first leaves the compressor unit 16P through a compressor outlet 161P and is guided to enter the outdoor heat exchanger 18P for extracting heat to ambient air. The refrigerant is then guided to pass through a fluid valve 103P, a drying filter 104P, an expansion valve 105P, and enter the indoor heat exchanger 17P for absorbing heat from an indoor space. After the heat exchange process, the refrigerant is guided to flow back to the compressor unit 16P through a compressor inlet 162P.

Referring to FIG. 4 of the drawings, a conventional window-type air conditioning and heat pump system is illustrated. The structure is similar to the conventional window-type air conditioning system described above. The conventional window-type air conditioning and heat pump system further comprises a four-way valve 19P connected between the compressor unit 16P, the outdoor heat exchanger 18P, and the indoor heat exchanger 17P. The four-way valve 19P has first through fourth connecting port 191P, 192P, 193P, 194P. Depending in the flowing route of the refrigerant, the conventional window-type air conditioning and heat pump system may operate between an air conditioning mode and a heat pump mode.

When the conventional window-type air conditioning and heat pump system operates in the air conditioning mode, the four-way valve 19P is configured such that the first connecting valve 191P is connected to the second connecting valve 192P, while the third connecting valve 193P is connected to the fourth connecting valve 194P. The refrigerant first leaves the compressor unit 16P through the compressor outlet 161P and passes through the first connecting port 191P and the second connecting port 192P of the four-way valve 19P. The refrigerant then passes through the outdoor heat exchanger 18P for releasing heat to the ambient air. The refrigerant then leaves the outdoor heat exchanger 18P and passes through a unidirectional valve 20P, a drying filter 104P, an expansion valve 105P, and enters the indoor heat exchanger 17P for absorbing heat from the indoor space. The refrigerant then leaves the indoor heat exchanger 17P and passes through the fourth connecting port 194P, the third connecting port 193P, and goes back to the compressor unit 16P through the compressor inlet 162P.

When the conventional window-type air conditioning and heat pump system operates in the heat pump mode, the four-way valve 19P is configured such that the first connecting valve 191P is connected to the fourth connecting valve 194P, while the second connecting valve 192P is connected to the third connecting valve 193P. The refrigerant first leaves the compressor unit 16P through the compressor outlet 161P and passes through the first connecting port 191P and the fourth connecting port 194P of the four-way valve 19P. The refrigerant then passes through the indoor heat exchanger 17P for releasing heat to the indoor space. The refrigerant then leaves the indoor heat exchanger 17P and passes through a unidirectional valve 20P, a drying filter 104P, an expansion valve 105P, and enters the outdoor heat exchanger 18P for absorbing heat from the ambient air. The refrigerant then leaves the outdoor heat exchanger 18P. The refrigerant then passes through the second connecting port 192P, the third connecting port 193P, and goes back to the compressor unit 16P through the compressor inlet 162P.

There are several deep-seated disadvantages of conventional window-type air conditioning system which discourage further widespread use of them. In fact, split-type air conditioning and/or heat pump systems have been developed to substitute the use of window-type air conditioning systems.

The first disadvantage of a typical window-type air conditioning system is that the Coefficient of Performance (COP) is very low. A typical window-type air conditioning system usually has a C.O.P. of approximately 2.7. As a comparison, a typical split-type air conditioning system has a C.O.P. of approximately 3.2.

The second disadvantage of a typical window-type air conditioning system is that it is generally very noisy. Although noise attenuation technology has been developed to tackle this problem, the result is generally unsatisfactory, especially when the air conditioning system is located very close to its user. The loud noise produced by the air condition system may prevent the user from, say, sleeping properly.

The third disadvantage is that it is very hard to perform maintenance on a typical window-type air conditioning system. A window-type air conditioning system is installed on a window, and the installation makes it very difficult for a user to clean or repair it. When maintenance is necessary, the entire process typically requires two to three trained technicians and extensive work.

SUMMARY OF THE PRESENT INVENTION

An objective of the present invention is to provide a window-type air conditioning system comprising a water cooling unit which utilizes water as a cooling agent.

Another objective of the present invention is to provide a window-type air conditioning system which has a substantially enhanced Coefficient of Performance (C.O.P) and energy efficiency.

Another objective of the present invention is to provide a window-type air conditioning system which has a substantially improved noise reduction technology which prevents the window-type air conditioning system from making loud noise.

Another objective of the present invention is to provide a window-type air conditioning system which can be embodied as an air conditioner or as a heat pump. The water cooling unit can be selectively used for cooling the refrigerant circulating in the window-type air conditioning system when the window-type air conditioning system is used as an air conditioner.

Another objective of the present invention is to provide a window-type air conditioning system which comprises a dehumidifying heat exchanger for ensuring that the indoor space has a desirable range of relative humidity.

Another objective of the present invention is to provide a window-type air conditioning system which allows fresh air to be delivered to the indoor space at a predetermined temperature so as to ensure air quality of the indoor space.

Another objective of the present invention is to provide a window-type air conditioning system comprising a maintenance arrangement for ensuring easy and convenient maintenance of the window-type air conditioning system.

In one aspect of the present invention, it provides a window-type air conditioning system, comprising:

an outer housing having an indoor compartment, an outdoor compartment, a water tank for storing a predetermined amount of cooling water, at least one outdoor air outlet, and an outdoor air inlet;

a fan assembly which comprises an outdoor fan unit and an indoor fan unit movably accommodated in the outdoor compartment and the indoor compartment respectively;

a compressor unit provided in the outdoor compartment;

an evaporator unit provided in the indoor compartment; and a water cooling unit provided in the outdoor compartment, which comprises:

a pumping device provided in the water tank for pumping the cooling water;

a top water collection basin for collecting the cooling water from the pumping device;

a fill material unit provided underneath the top water collection basin, wherein the cooling water collected in the top water collection basin is arranged to flow through the fill material unit;

a bottom water collection basin provided underneath the fill material unit, the cooling water from the fill material unit being arranged to be collected in the bottom water collection basin; and at least one heat exchanging pipe provided in the bottom water collection basin and immersed in the cooling water, the cooling water collected in the bottom water collection basin being arranged to be guided to flow back into the top water collection basin, a predetermined amount of refrigerant being arranged to flow through the heat exchanging pipe in such a manner that the refrigerant is arranged to perform highly efficient heat exchanging process with the cooling water for lowering a temperature of the refrigerant, a predetermined amount of air being drawn from the outdoor air inlet for performing heat exchange with the cooling water flowing through the fill material unit for lowering a temperature of the cooling water, the air having absorbed the heat from the cooling water being discharged out of the outer housing through the outdoor air outlet.

DETAILED DESCRIPTION OF THE PREFERRED EMBODIMENT

The following detailed description of the preferred embodiments are the preferred modes of carrying out the invention. The description is not to be taken in any limiting sense. It is presented for the purpose of illustrating the general principles of the present invention.

Figure 1:
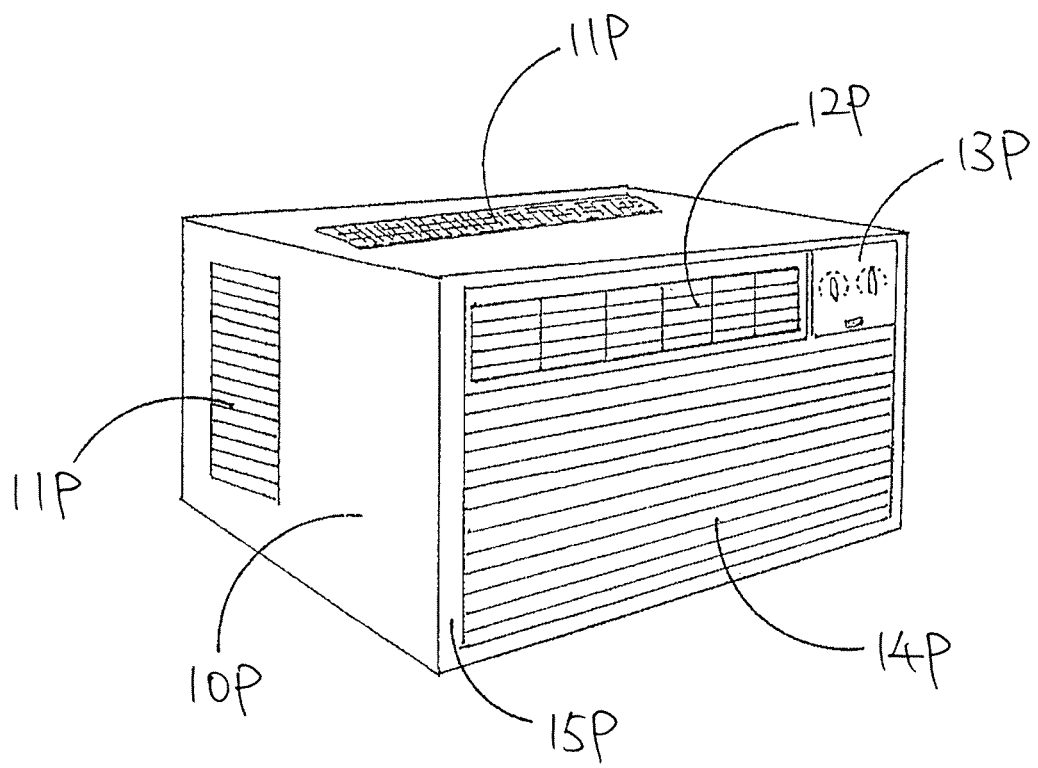
FIG. 1 is a conventional window-type air conditioning system.
Figure 2:
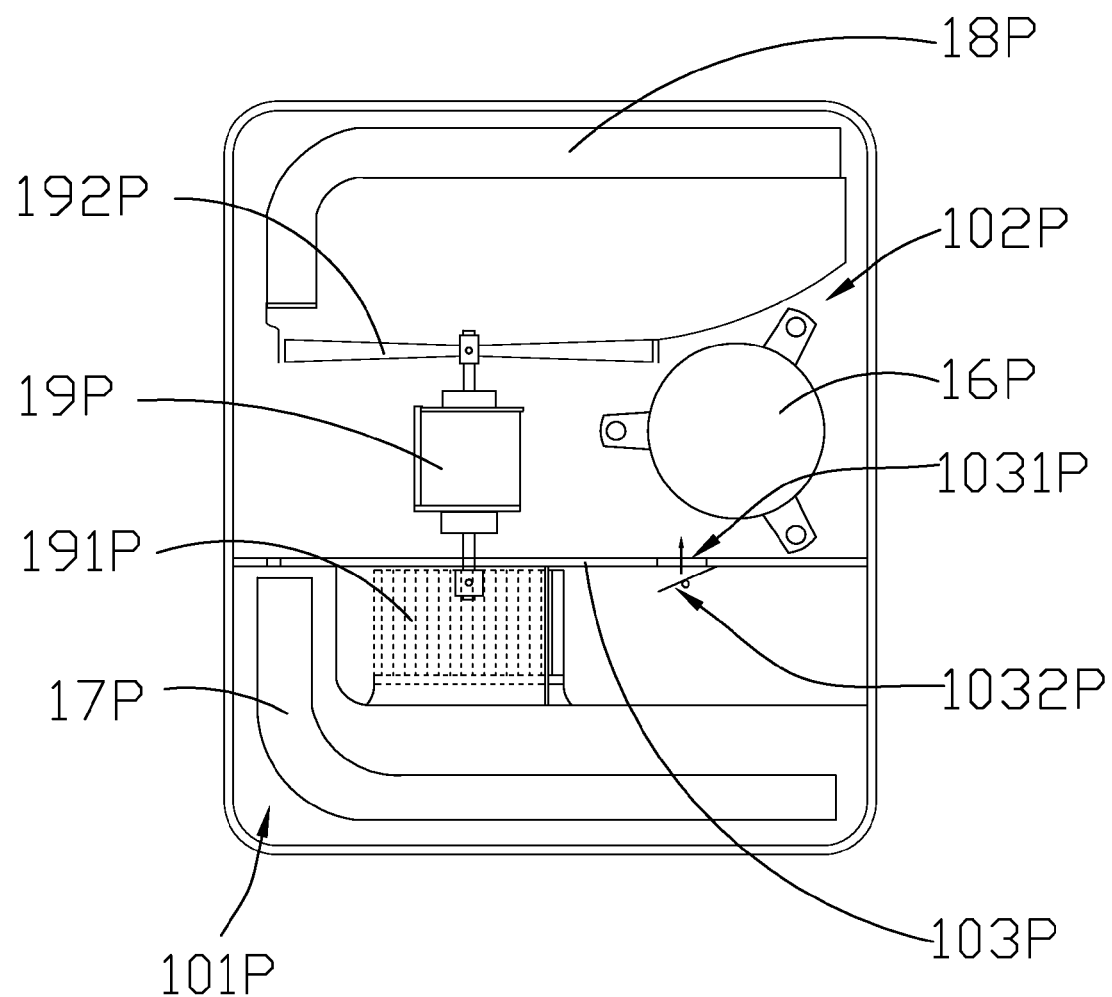
FIG. 2 is a sectional view of the conventional window-type air conditioning system.
Figure 3:
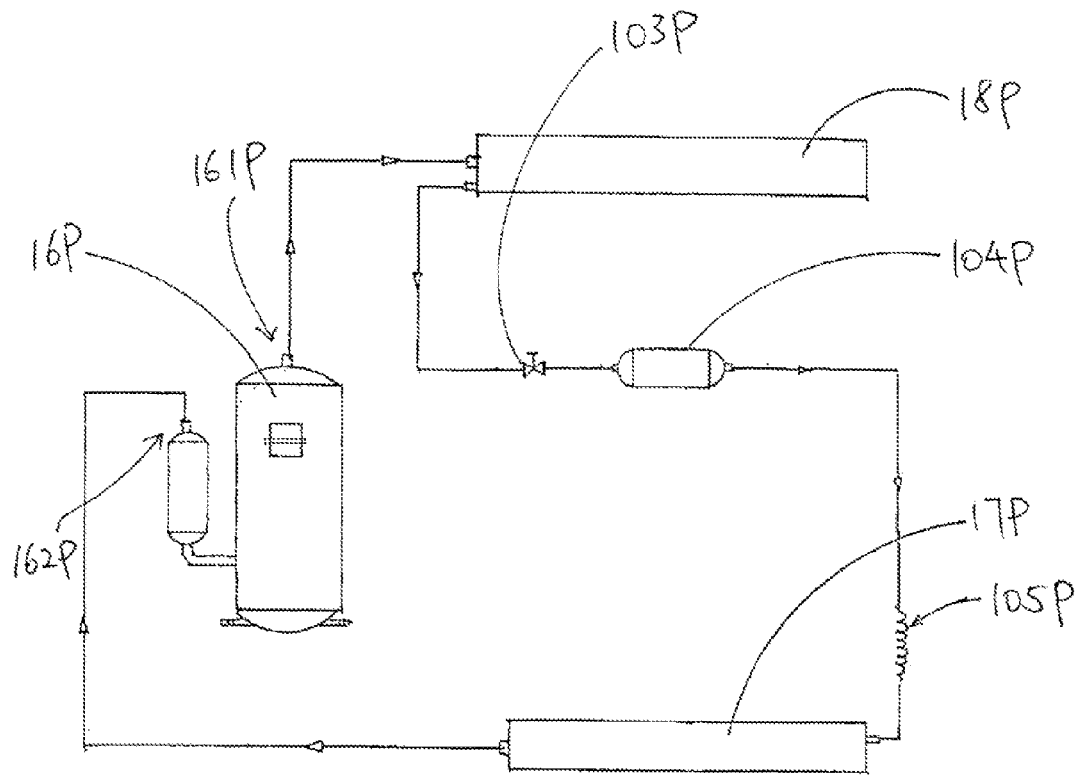
FIG. 3 is a schematic diagram of a refrigerant cycle of the conventional window-type air conditioning system.
Figure 4:
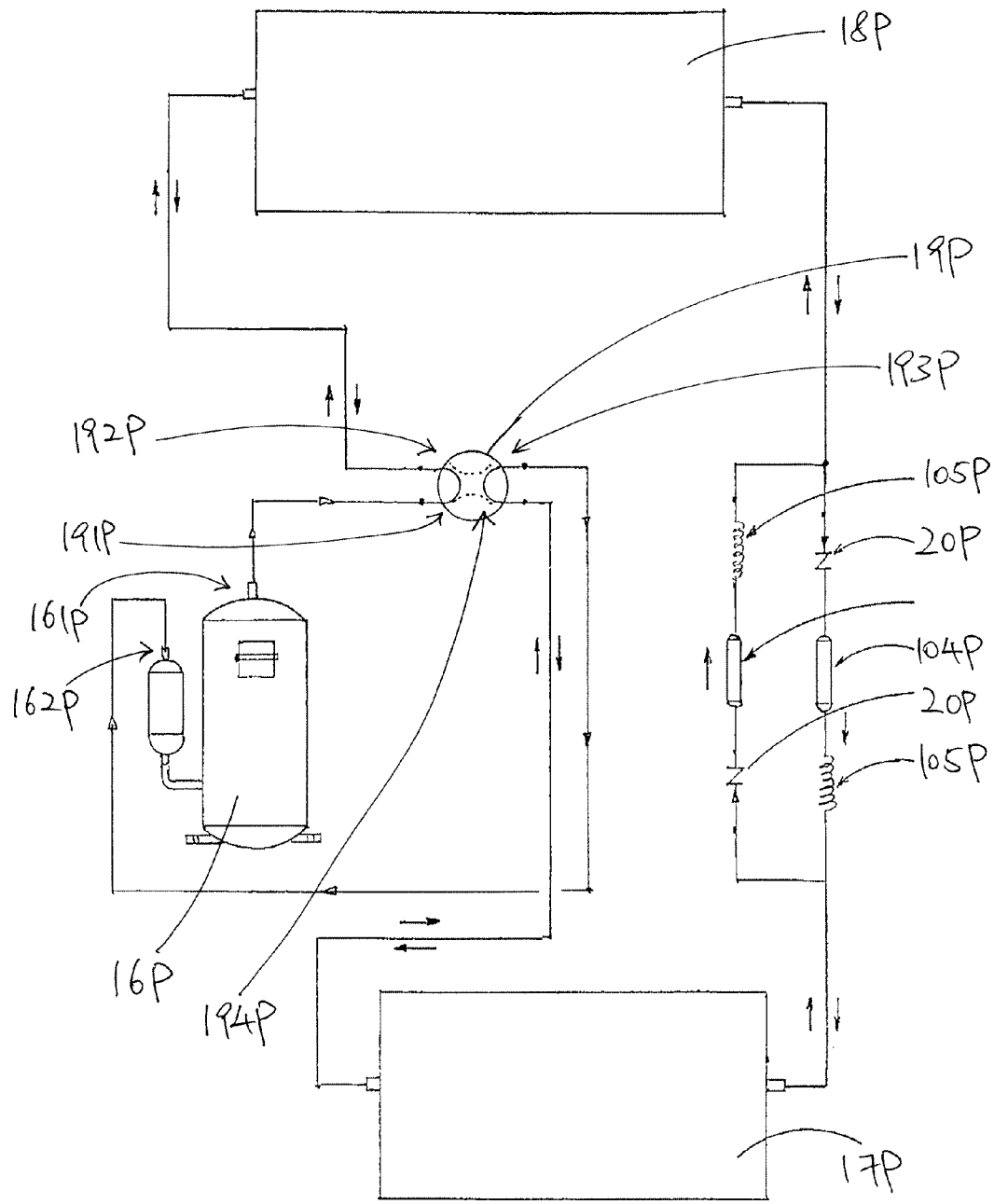
FIG. 4 is a schematic diagram of a conventional window-type air conditioning and heat pump system.
Figure 5:
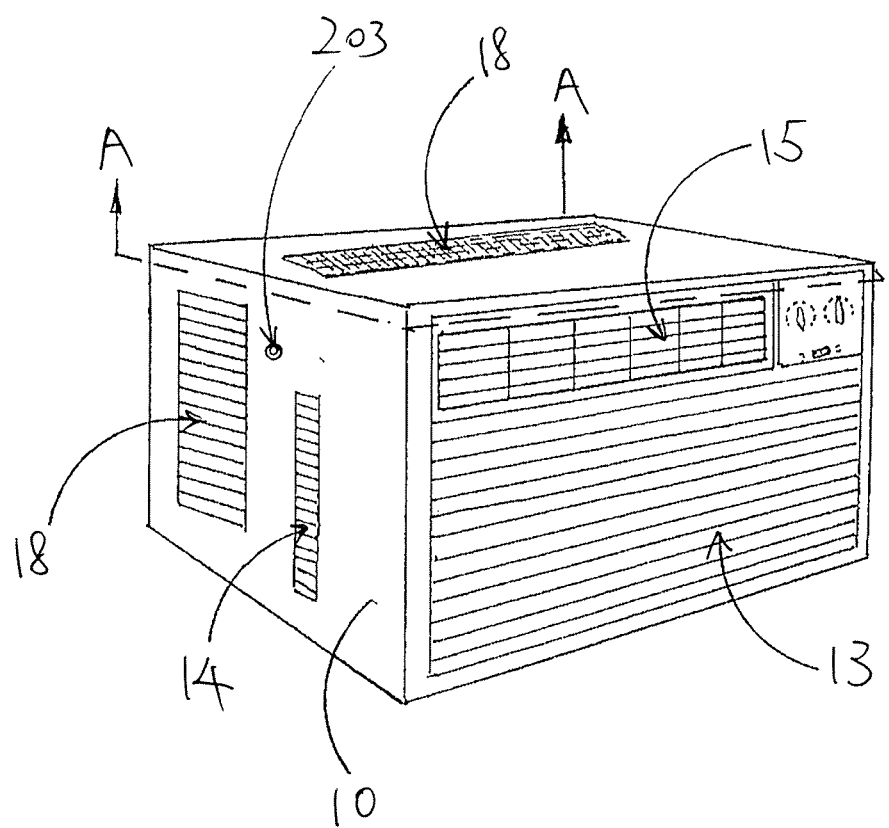
FIG. 5 is a perspective view of a window-type air conditioning system according to a first preferred embodiment of the present invention.
Figure 6:
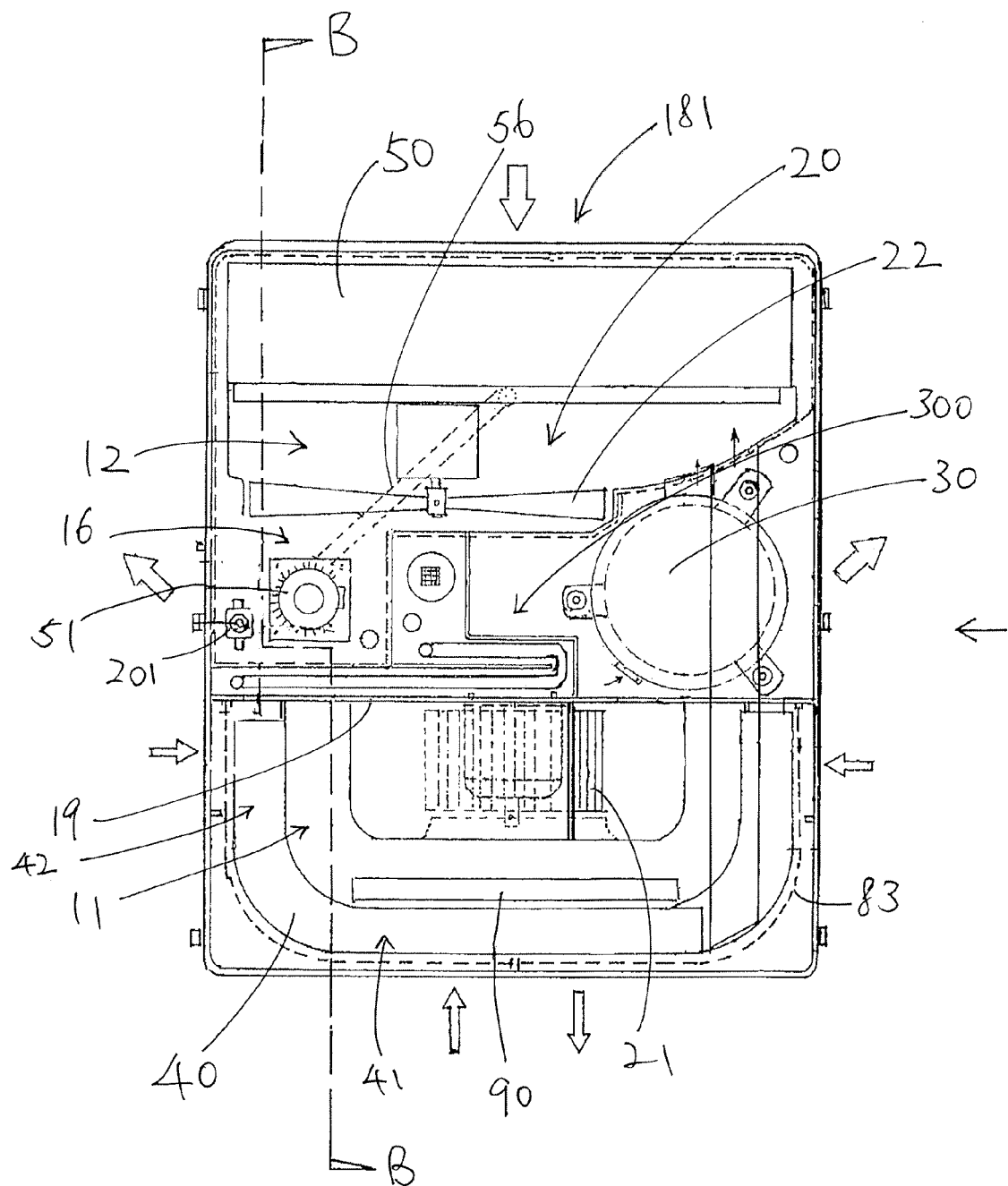
FIG. 6 is a sectional view of the window-type air conditioning system along plane A-A of FIG. 5.

Referring to FIG. 5 to FIG. 6 of the drawings, a window-type air conditioning system according to a first preferred embodiment of the present invention is illustrated. Broadly, the window-type air conditioning system comprises an outer housing 10, a fan assembly 20, a compressor unit 30, an evaporator unit 40, and a water cooling unit 50.

Figure 7:
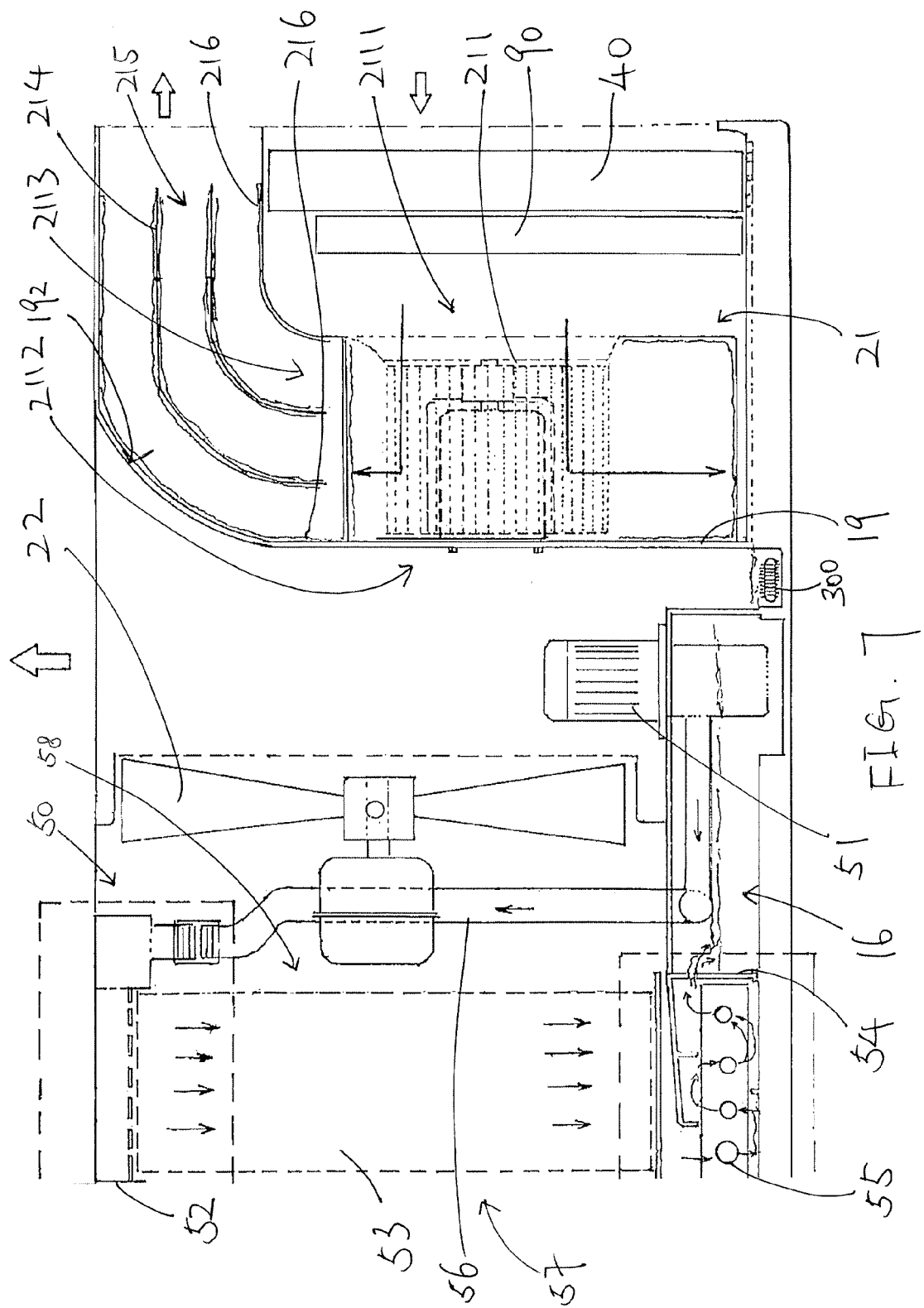
FIG. 7 is a sectional view of the window-type air conditioning system along plane B-B of FIG. 6.

The outer housing 10 has an indoor compartment 11, an outdoor compartment 12, an indoor front air inlet 13, two side air inlets 14 formed at two sides of the outer housing 10 respectively, an indoor air outlet 15, a water tank 16 for storing a predetermined amount of cooling water, and a water inlet 17 for allowing cooling water to be refilled in the water tank 16, a plurality of outdoor air outlets 18, and an outdoor air inlet 181. As shown in FIG. 5 and FIG. 7 of the drawings, there are three outdoor air outlets 18 formed on two sides and a top side of the outer housing 10 respectively. The outdoor air inlet 181 is formed on a rear side of the outer housing 10.

The fan assembly 20 comprises an indoor fan unit 21 and an outdoor fan unit 22 movably accommodated in the indoor compartment 11 and the outdoor compartment 12 respectively.

The compressor unit 30 is provided in the outdoor compartment 12 of the outer housing 10. The evaporator unit 40 is provided in the indoor compartment 11 of the outer housing 10.

The water cooling unit 50 is provided in the outdoor compartment 12, and comprises a pumping device 51 provided in the water tank 16 for pumping the cooling water, a top water collection basin 52 for collecting the cooling water from the pumping device 51, a fill material unit 53, a bottom water collection basin 54, and at least one heat exchanging pipe 55.

The fill material unit 53 is provided underneath the top water collection basin 52, wherein the cooling water collected in the top water collection basin 52 is arranged to flow through the fill material unit 53 as a thin water film.

The bottom water collection basin 54 is provided underneath the fill material unit 53, wherein the cooling water from the fill material unit 53 is arranged to be collected in the bottom water collection basin 54.

The heat exchanging pipe 55 is provided in the bottom water collection basin 54 and immersed in the cooling water. The cooling water collected in the bottom water collection basin 54 is arranged to be guided to flow back into the top water collection basin 52 through a cooling water pipe 56. A predetermined amount of working fluid, such as a predetermined amount of refrigerant, is arranged to flow through the heat exchanging pipe 55 in such a manner that the refrigerant is arranged to perform highly efficient heat exchanging process with the cooling water for lowering a temperature of the refrigerant, At the same time, a predetermined amount of air is drawn from an air inlet side 57 of the water cooling unit 50 for performing heat exchange with the cooling water flowing through the fill material unit 53 for lowering a temperature of the cooling water. The air having absorbed the heat from the cooling water is discharged out of the outer housing 10 through the outdoor air outlet 18 at an air outlet side 58 of the water cooling unit 50. The air inlet side 57 communicates with the outdoor air inlet 181 of the outer housing 10, while the air outlet side 58 communicates with the outdoor air outlets 18 of the outer housing 10.

According to the first preferred embodiment of the present invention, the outer housing 10 further comprises a partitioning member 19 to divide the outer housing 10 into the indoor compartment 11 and the outdoor compartment 12.

The air is drawn by the outdoor fan unit 22 to flow from the outdoor air inlet 181, pass through the fill material unit 53, and exit the outer housing 10 through the outdoor air outlets 18. Thus, the outdoor fan unit 22 is preferably an axial fan which is positioned adjacent to the air outlet side 58 of the water cooling unit 50.

The water tank 16 and the bottom water collection basin 54 are positioned in a side-by-side manner. The cooling water collected in the bottom water collection basin 54 is guided to flow into the water tank 16, which is then pumped back to the top water collection basin 52 by the pumping device 51 via a cooling water pipe 56.

Figure 8:
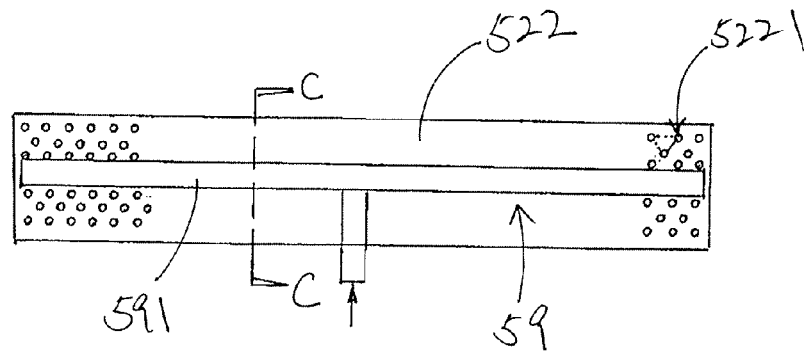
FIG. 8 is a top view of a top water collection basin of a water cooling unit of the window-type air conditioning system according to the first preferred embodiment of the present invention.
Figure 9:
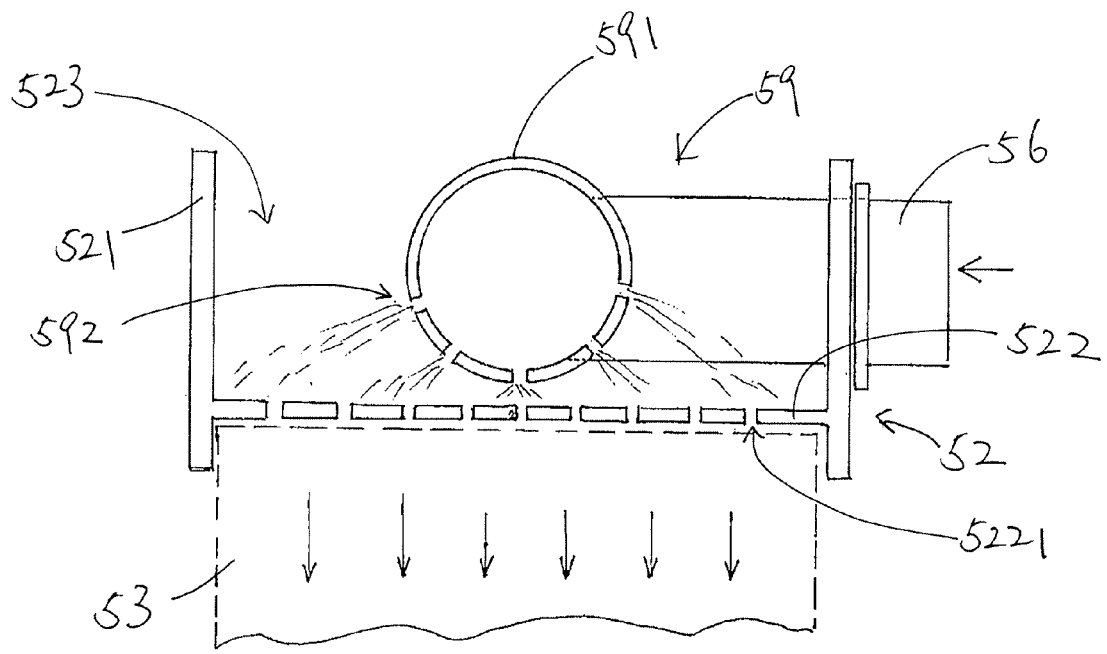
FIG. 9 is a sectional view of the top water collection basin along plane C-C of FIG. 8.

Referring to FIG. 8 to FIG. 9 of the drawings, the top water collection basin 52 has at least one peripheral sidewall 521 and a bottom wall 522 to define a storing cavity 523 between the peripheral sidewall 521 and the bottom wall 522. The cooling water coming from the water tank 16 is arranged to be stored in the storing cavity 523. The bottom wall 522 has a plurality of passage holes 5221, wherein the cooling water stored in the storing cavity 523 may flow onto the fill material unit 53 through the passage holes 5221.

Furthermore, the passage holes 5221 are distributed along the bottom wall 522 in a predetermined array, wherein a center of each of the passage holes 5221 in a particular row is arranged not to align with that of the passage holes 5221 in the next row. Moreover, each two adjacent passage holes 5221 of an upper row thereof is arranged to form a triangular distribution with a corresponding passage hole 5221 of the adjacent row of the passage holes 5221, as shown in FIG. 8 of the drawings. All of the passage holes 5221 have an identical shape and size.

The water cooling unit 5 further comprises a water distributor 59 provided on a top end portion of the cooling water pipe 56 for distributing the cooling water into the storing cavity 523 of the top water collection basin 52. Specifically, the water distributor 59 comprises a distributor tube 591 longitudinally extended along a longitudinal direction of the top water collection basin 52, and a plurality of distributing slots 592 formed on the distributor tube 591. The cooling water flowing in the cooling water pipe 56 is allowed to flow into the distributor tube 591 and then into the storing cavity 523 via the distributing slots 592. The distributor tube 591 has a substantially circular cross section. The distributing slots 592 are evenly formed on a lower circular portion of the distributor tube 591 so that the cooling water can be evenly spread on the bottom wall 522 of the top water collection basin 52. The evenly distributed cooling water in the storing cavity 523 is then allowed to flow onto the fill material unit 53 via the evenly distributed passage holes 5221 as shown in FIG. 9 of the drawings. These structures ensure that a water thin film can be evenly formed in the fill material unit 53 as the cooling water flows downwardly along the fill material unit 53.

Figure 10:
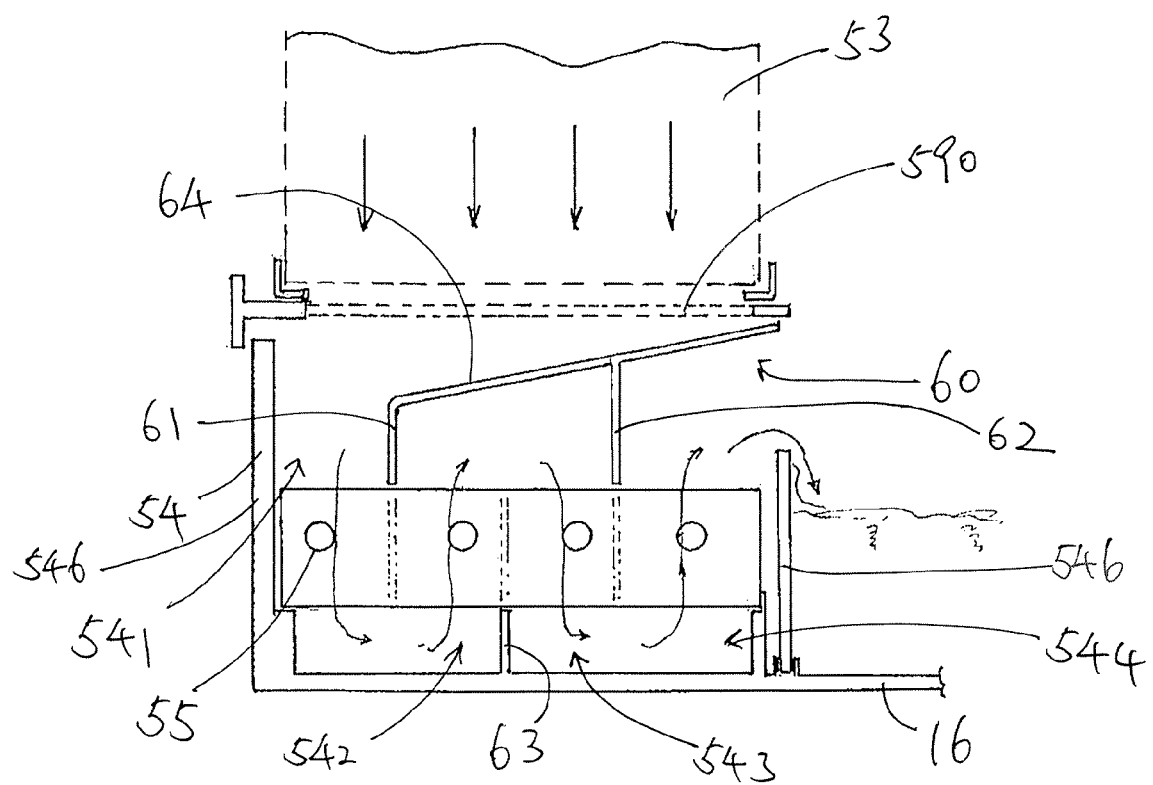
FIG. 10 is a schematic diagram of a bottom water collection basin according to the first preferred embodiment of the present invention.

Referring to FIG. 10 of the drawings, the water cooling unit 50 further comprises a filter 590 provided between the fill material unit 53 and the bottom water collection basin 54 for preventing unwanted substances from entering the bottom water collection basin 54.

The water cooling unit 50 further comprises a guiding arrangement 60 supported in the bottom water collection basin 54 for guiding the cooling water to flow in a predetermined pattern in the bottom water collection basin 54. More specifically, the guiding arrangement 60 comprises an inclined guiding member 64, a first and a second vertical guiding members 61, 62 vertically extended in the bottom water collection basin 54, and a third vertical guiding member 63. The inclined guiding member 64 downwardly and inclinedly extends from one end of the filter 590 along a transverse direction thereof. The first through third vertical guiding members 61, 62, 63 vertically extend in the bottom water collection basin 54 to divide the bottom water collection basin 54 into first through fourth heat exchanging chambers 541, 542, 543, 544. A predetermined number of heat exchanging pipes 55 are received in each of the heat exchanging chambers 541, 542, 543, 544.

As shown in FIG. 10 of the drawings, the first vertical guiding member 61 extends from a distal end of the inclined guiding member 64. The second vertical guiding member 62 also downwardly extends from the inclined guiding member 64, while the third vertical guiding member 63 extends from a bottom wall 545 of the bottom water collection basin 54 at a position between the first vertical guiding member 61 and the second vertical guiding member 62.

According to the first preferred embodiment of the present invention, the first heat exchanging chamber 541 is formed between a sidewall 546 of the bottom water collection basin 54 and the first vertical guiding member 61. The second heat exchanging chamber 542 is formed between first vertical guiding member 61 and the third vertical guiding member 63. The third heat exchanging chamber 543 is formed between the third vertical guiding member 63 and the second vertical guiding member 62. The fourth heat exchanging chamber 544 is formed between the second vertical guiding member 62 and another sidewall 546 of the bottom water collection basin 54.

It is important to mention that each particular heat exchanging chamber 541 (542) (543) (544) may communicate with an adjacent heat exchanging chamber so that the cooling water is guided to flow through the first through fourth heat exchanging chamber 541, 542, 543, 544 in a sequential manner.

The cooling water coming from the fill material unit 53 will hit the inclined guiding member 64 and is guided to flow into the first heat exchanging chamber 541 in a downward direction. The cooling water is arranged to perform heat exchange with the heat exchanging pipes 55 in the first heat exchanging chamber 541. The cooling water is then guided to flow into the second heat exchanging chamber 542 in an upward direction and perform heat exchange with the heat exchanging pipes 55 in the second heat exchanging chamber 542. The cooling water is then guided to flow into the third heat exchanging chamber 543 again in a downward direction and perform heat exchange with the heat exchanging pipes 55 in the third heat exchanging chamber 543. Finally, the cooling water is then guided to flow into the fourth heat exchanging chamber 544 in an upward direction and perform heat exchange with the heat exchanging pipes 55 in the fourth heat exchanging chamber 544. Finally, the cooling water is then guided to flow into the water tank 16. The heat exchange process between the cooling water and the heat exchanging pipes 55 are for extracting heat from the refrigerant flowing through the heat exchanging pipes 55 to the cooling water, which is then pumped and guided to be cooled in the fill material unit 53.

Figure 11:
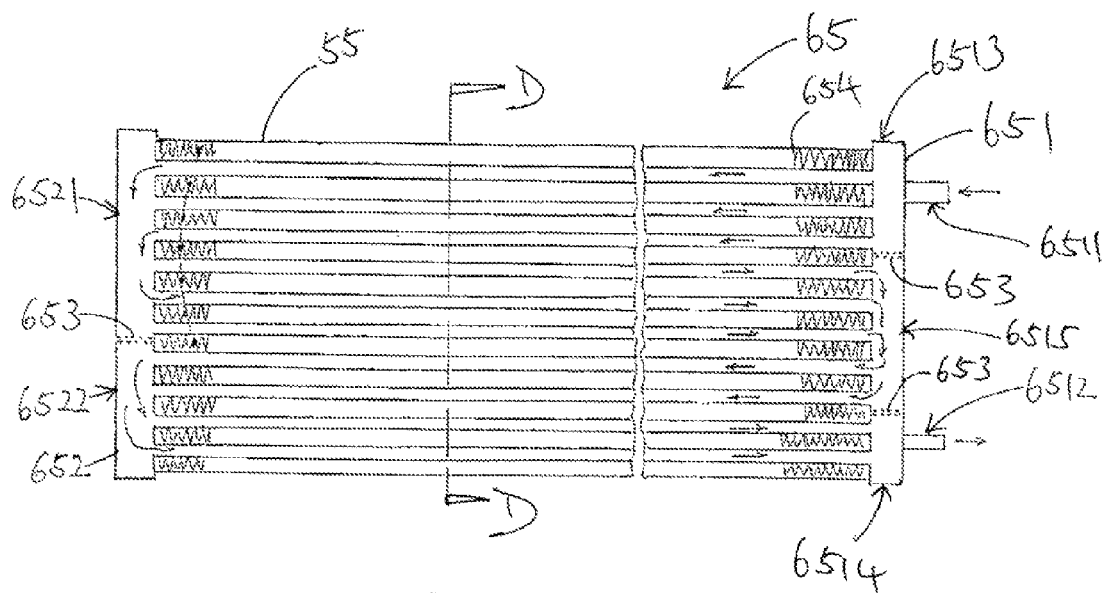
FIG. 11 is a schematic diagram of a refrigerant guiding system of the window-type air conditioning system according to the first preferred embodiment of the present invention.
Figure 12:
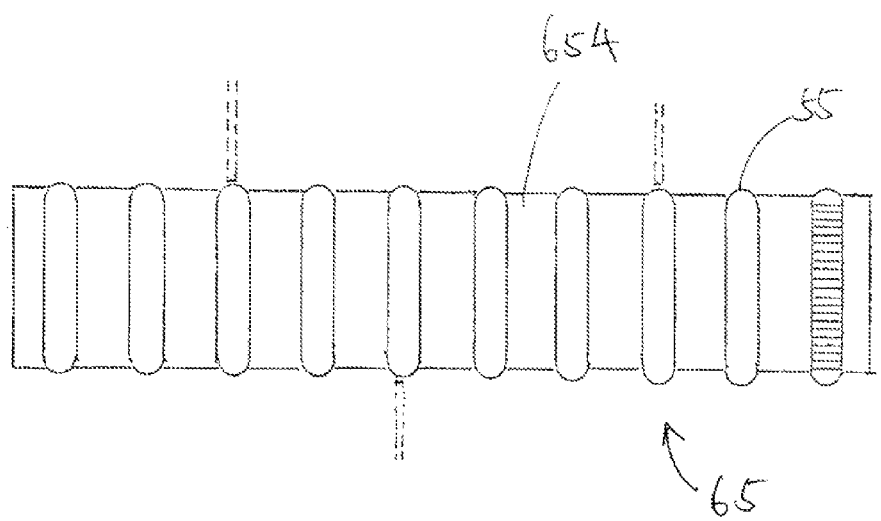
FIG. 12 is sectional view of the refrigerant guiding system of the window-type air conditioning system along plane D-D of FIG. 11.

Referring to FIG. 11 to FIG. 12 of the drawings, the water cooling unit 22 further comprises a refrigerant guiding system 65 connected to the heat exchanging pipes 55 to divide the heat exchanging pipes 55 into several piping groups so as to guide the refrigerant to flow through the various piping groups in a predetermined order.

As shown in FIG. 11 of the drawings, the refrigerant guiding system 65 comprises an inlet collection pipe 651 and a guiding pipe 652, wherein each of the heat exchanging pipes 55 has one end connected to the inlet collection pipe 651, and another end connected to the guiding pipe 652. As shown in FIG. 11 of the drawings, the inlet collection pipe 651 has a fluid inlet 6511 and a fluid outlet 6512. The refrigerant guiding system 65 further comprises a plurality of dividers 653 provided in at least one of the inlet collection pipe 651 and the guiding pipe 652 to divide the heat exchanging pipes 55 into a plurality of piping groups. Each of the dividers 653 prevents fluid from passing from one side of the divider 653 to the other side thereof.

According to the first preferred embodiment of the present invention, there are altogether ten heat exchanging pipes 55. Two dividers 653 are provided in the inlet collection pipe 651 to divide the inlet collection pipe 651 into an inlet portion 6513, an outlet portion 6514, and one intermediate portion 6515. The fluid inlet 6511 is formed on the inlet portion 6513, while the fluid outlet 6512 is formed on the outlet portion 6514. One divider 653 is also provided in the guiding pipe 652 to evenly divide the guiding pipe 652 into two portions 6521, 6522.

The ten heat exchanging pipes 55 in the water cooling unit 50 are divided into first through fourth piping groups. The first piping group is constituted by the three heat exchanging pipes 55 connecting to the inlet portion 6513 of the inlet collection pipe 651. The second piping group is constituted by the next three heat exchanging pipes 55 connecting to the intermediate portion 6515 of the inlet collection pipe 651 and the first portion 6521 of the guiding pipe 652. The third piping group is constituted by the next two heat exchanging pipes 55 connecting to the intermediate portion 6515 and the second portion of the guiding pipe 6522. The fourth piping group is constituted by the remaining two heat exchanging pipes 55 connecting to the outlet portion 6514 of the inlet collection pipe 651.

The refrigerant enters the inlet collection pipe 651 through the fluid inlet 6511. The refrigerant entering the inlet collection pipe 651 is guided to flow through the first piping group and enter the first portion 6521 of the guiding pipe 652. The refrigerant is then guided by the divider 653 in the guiding pipe 652 to enter flow through the second piping group and re-enter the inlet collection pipe 651. The refrigerant is then guided to flow into the third piping group by the divider 653 and re-enter the second portion 6522 of the guiding pipe 652. The refrigerant is then guided to flow through the fourth piping group and enter the outlet portion 6514 of the inlet collection pipe 651. The refrigerant then exits the inlet collection pipe 651 through the fluid outlet 6512.

Moreover, the refrigerant guiding system 65 further comprises a plurality of heat exchanging fins 654 extended between each two adjacent heat exchanging pipes 55 for substantially increasing a surface area of heat exchanging process between the heat exchanging pipes 55 and the cooling water, and for reinforcing a structural integrity of the refrigerant guiding system 65. These heat exchanging fins 654 may be integrally extended from an outer surface of the heat exchanging pipes 55, or externally attached or welded on the outer surfaces of the heat exchanging pipes 55.

As shown in FIG. 10 of the drawings, the cooling water is guided to flow from the fourth piping group to the first piping group for maximizing heat exchange efficiency between the refrigerant and the cooling water. As a result, the first through fourth piping groups are accommodated in the fourth through first heat exchanging chambers 541, 542, 543, 544 respectively.

Figure 13:
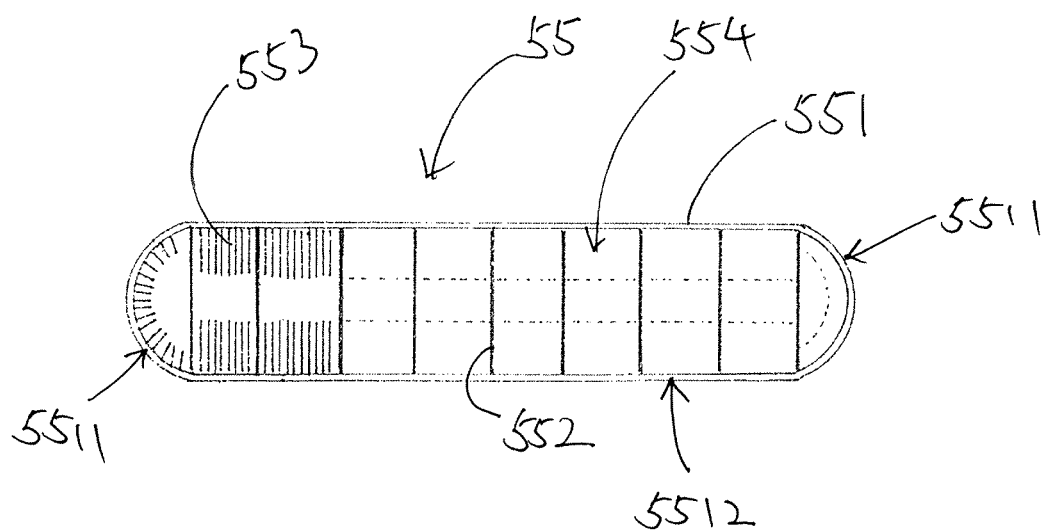
FIG. 13 is a sectional side view of a heat exchanging pipe according to the first preferred embodiment of the present invention.

Referring to FIG. 13 of the drawings, each of the first heat exchanging pipes 55 comprises a pipe body 551, a plurality of retention members 552 spacedly formed in the pipe body 551, and a plurality of heat exchanging fins 553 extended from an inner surface of the pipe body 551. The pipe body 551 has two curved side portions 5511 and a substantially flat mid portion 5512 extending between the two curved side portions 5511 to form a rectangular cross sectional shape at the mid portion 5512 and two semicircular cross sectional shapes at two curved side portions 5511 of the corresponding heat exchanging pipe 55.

The retention members 552 are spacedly distributed in the mid portion 5512 along a transverse direction of the corresponding pipe body 551 so as to form a plurality of pipe cavities 554. Each of the retention members 552 has a predetermined elasticity for reinforcing the structural integrity of the corresponding heat exchanging pipe 55. The heat exchanging fins 553 are spacedly and evenly distributed along the entire inner surface of pipe body 551 for enhancing heat exchange performance between the refrigerant flowing through the corresponding heat exchanging pipe 55 and the cooling water. Alternatively, each of the retention members 552 is configured from ductile material such as metal for reinforcing the structural integrity of the heat exchanging pipe 55.

According to the preferred embodiment of the present invention, each of the heat exchanging pipes 55 may be configured from aluminum which can be recycled and reused very conveniently and economically. In order to make the heat exchanging pipes 55 to resist corrosion and unwanted oxidation, each of the heat exchanging pipes 55 has a thin oxidation layer formed on an exterior surface and an interior surface thereof for preventing further corrosion of the relevant heat exchanging pipe. The formation of this thin oxidation layer can be by anode oxidation method. Moreover, each of the heat exchanging pipes 55 may also have a thin layer of polytetrafluoroethylene or similar coating formed on an exterior surface thereof to prevent unwanted substances from attaching on the exterior surfaces of the heat exchanging pipes 55.

Figure 14:
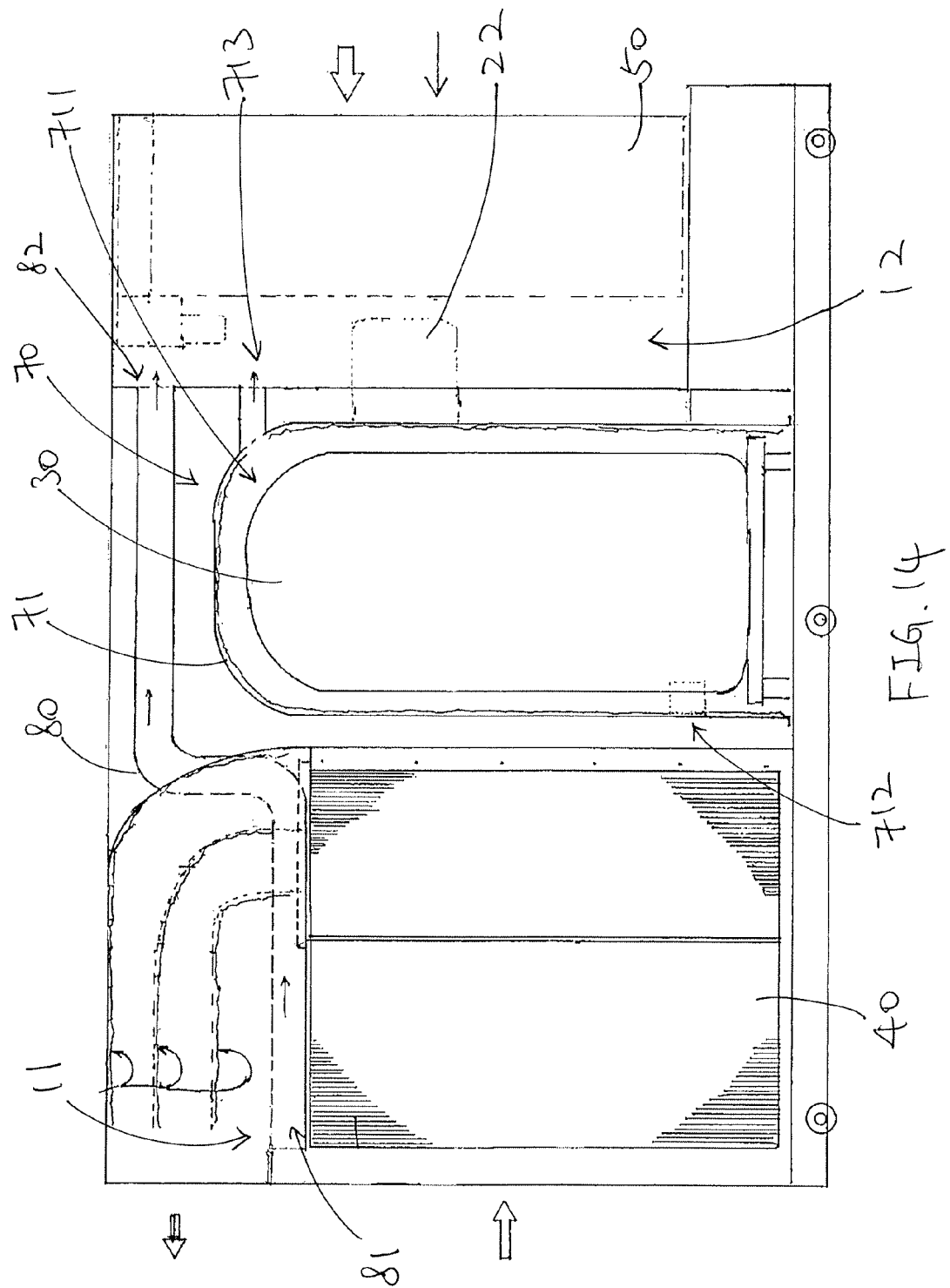
FIG. 14 is a sectional side view the window-type air conditioning system according to the first preferred embodiment of the present invention.

Referring to FIG. 6 and FIG. 14 of the drawings, the window-type air conditioning system further comprises a noise attenuation arrangement 70 for reducing the noise produced by the compressor unit 30. The noise attenuation arrangement 70 comprises a noise reduction shell 71 having a noise reduction cavity 711, wherein the compressor unit 30 is accommodated in the noise reduction cavity 711 for preventing noise from propagating out of the noise reduction shell 71. The noise reduction shell 71 is configured from or provided with a layer of noise absorbing material for preventing noise from propagating out of the noise reduction shell 71.

In order to reduce the temperature in the noise reduction cavity 711, the noise reduction shell 71 has a ventilating inlet 712 provided at a lower portion of the noise reduction shell 71, and a ventilating outlet 713 provided at an upper portion of the noise reduction shell 71. The ventilating inlet 712 communicates the noise reduction cavity 711 with the indoor compartment 11, while the ventilating outlet 713 communicates the noise reduction cavity 711 with the outdoor compartment 12, in such a manner that when the outdoor fan unit 22 is operating, air is drawn from the indoor compartment 11 to pass through the noise reduction cavity 711 and eventually reach the outdoor compartment 12 for reducing the temperature of the noise reduction cavity 711.

The window-type air conditioning system further comprises a discharge pipe 80 provided and extended in the indoor compartment 11 of the outer housing 10. The discharge pipe 80 has a discharge inlet 81 provided at a side portion of the outer housing 10, and a discharge outlet 82 communicating with the outdoor compartment 12 near the outdoor fan unit 22 so that when the outdoor fan unit 22 is operating, air from the indoor space can be directly drawn to pass through the discharge pipe 80 and is discharged out of the outer housing 10 through the outdoor air outlet 18.

As shown in FIG. 6 of the drawings, the evaporator unit 40 is accommodated in the indoor compartment 11 of the outer housing 10. The evaporator unit 40 has a front portion 41 and two side portions 42 extended from two ends of the front portion 41 respectively. A longitudinal axis of the front portion 41 is aligned with that of the indoor front air inlet 13. The side portions 42 are located just next to the side air inlets 14 respectively. When the indoor fan unit 21 is operating, air from the indoor space is drawn to enter the window-type air conditioning system through the indoor front air inlet 13. The air from the indoor space is arranged to pass through the front portion 41 of the evaporator unit 40 and the temperature of the indoor air will be lowered while the refrigerant absorbs heat from the indoor space. The cooler air is then guided to be delivered back to the indoor space through the indoor air outlet 15.

At the same time, ambient air is also drawn to enter the outer housing 10 through the side air inlets 14. The newly drawn air is arranged to pass through an air filter 83 and the side portions 42 of the evaporator unit 40 to perform heat exchange with the refrigerant flowing therethrough. This arrangement ensures that the air quality of the indoor space can be maintained by supply fresh air directly from the ambient environment. Ambient air is arranged to pass through the evaporator unit 40 so that heat from the ambient air can be absorbed by the refrigerant passing through the evaporator unit 40. The side air inlets 14 serve to ensure that the indoor space will have adequate supply of fresh air from outside the indoor space. This is particularly important when the window-type air conditioning system is used in confined area in which fresh air should be adequately supplied, such as when the window-type air conditioning system is used in a hospital. The side air inlets 14 are provided on both sides of the outer housing 10 so that when either side is blocked by a building structure, the other side air inlet 14 can also be used to allow intake of fresh air.

Referring to FIG. 6 of the drawings, the window-type air conditioning system further comprises a dehumidifying heat exchanger 90 provided in the indoor compartment 11 at a position right behind the front portion 41 of the evaporator unit 40 in such a manner that indoor air is drawn to first pass through the evaporator unit 40 and then the dehumidifying heat exchanger 90 for dehumidifying the air from the indoor space. The air passing through the evaporator unit 40 and the dehumidifying heat exchanger 90 will have a lower temperature and will be discharged out of the outer housing 10 through the indoor air outlet 15, which is located at a top front portion of the outer housing 10.

Figure 15:
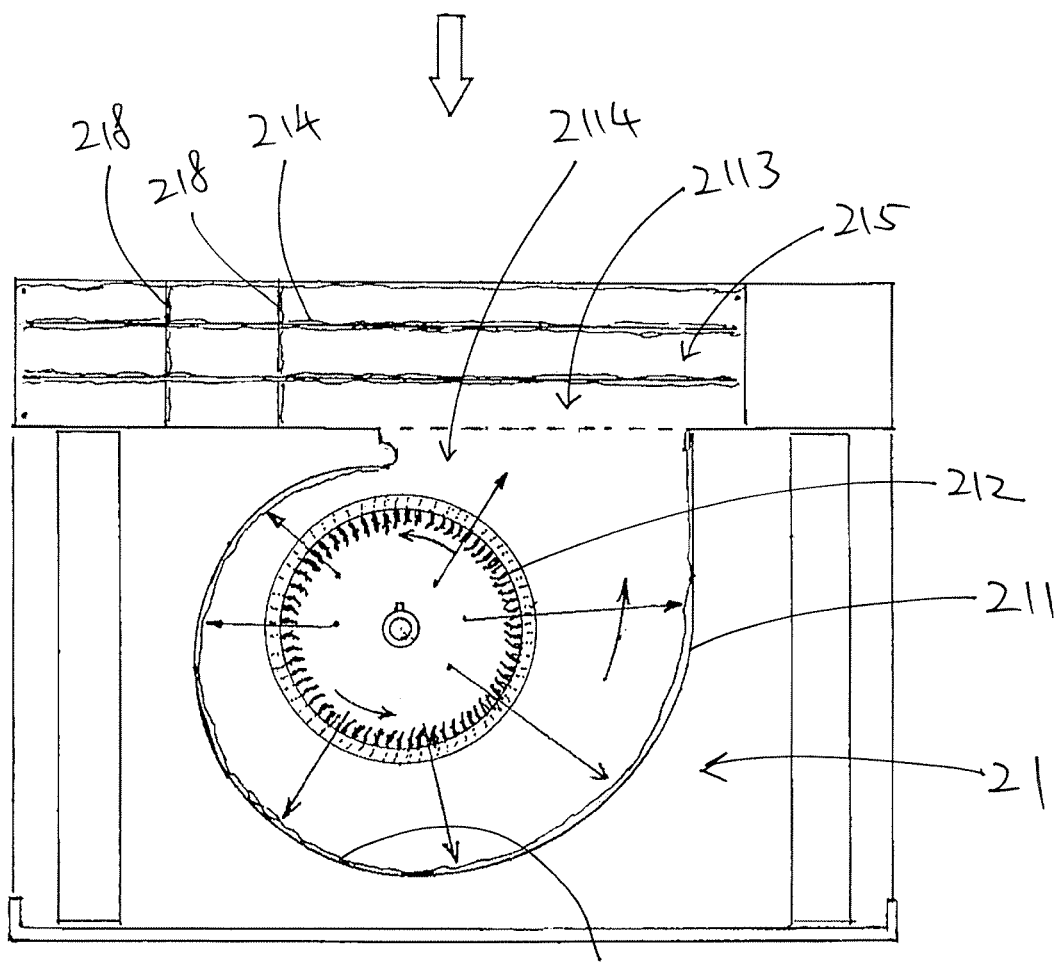
FIG. 15 is a schematic diagram of an indoor fan unit of a fan assembly of the window-type air conditioning system according to the first preferred embodiment of the present invention.

Referring to FIG. 7, FIG. 14 and FIG. 15 of the drawings, the indoor fan unit 21 of the fan assembly 20 is configured as a centrifugal fan and comprises fan casing 211 having a guiding outlet 2114, a plurality of centrifugal fan blades 212 rotating in the fan casing 211. The fan casing 211 has a front side 2111, a rear side 2112, and a top side 2113. The front side 2111 of the fan casing 211 faces toward the dehumidifying heat exchanger 90 and the front portion 41 of the evaporator unit 40 so that air from the indoor space is drawn from an axial direction of the indoor fan unit 21. The guiding outlet 2114 is formed at the top side of the fan casing 211. Since the indoor fan unit 21 is a centrifugal fan, the air will then be drawn to exit the indoor fan unit 21 at a radical direction thereof. As a result, the air will exit the indoor fan unit 21 through the guiding outlet 2114. The indoor fan unit 21 further comprises a plurality of outlet dividers 214 spacedly extended from the guiding outlet 2114 to form a plurality of air channels 215. The air channels 215 extend from the guiding outlet 2114 to the indoor air outlet 15 of the outer housing 10. The air drawn by the centrifugal fan blades 212 is guided to evenly enter the air channels 215.

It is worth mentioning that the indoor fan unit 21 is mounted on a lower portion 191 of the partitioning member 19, wherein an upper portion 192 of the partitioning member 19 is curved and constitutes a boundary for guiding the air flowing out from the guiding outlet 2114 to flow through the indoor air outlet 15 of the outer housing 10. Each of the outlet dividers 214 is also partially curved and is shaped and crafted to have a shape substantially the same as that of the upper portion 192 of the partitioning member 19. The reason for having a curved structure for the partitioning member 19 and the outlet dividers 214 is that when air passes through these elements, the noise produced by the vibration of the air, the partitioning member 19 and the outlet dividers 214 is at the minimum.

In order to minimize the noise produced by the indoor fan unit 21, the indoor fan unit 21 further comprises a plurality of noise absorbing layers 216 attached on an inner surface of the fan casing 211, inner surfaces of the upper portion 192 of the partitioning member 19, and the outlet dividers 214 respectively. Each of the noise absorbing layers 215 is configured from noise absorbing material which may effectively absorb vibration in the air so as to substantially reduce the noise produced by the indoor fan unit 21. As shown in FIG. 15 of the drawings, when the indoor fan unit 21 is operating, air entering the indoor fan unit 21 is diverted to flow out of the indoor fan unit 21 at a radical direction thereof and hit an inner side surface of the fan casing 211. As a result, the noise absorbing layer 216 serves to reduce the noise produced by the outflow of the air.

The fan blades 212 are provided on a rotor 213 which is driven to rotate for drawing air from the indoor space. The fan casing 211 has a receiving cavity 2115 for accommodating the rotor 213 and the fan blades 212. The fan casing 211 has a substantially circular cross section which substantially resembles the rotor 213 of the indoor fan unit 21. Moreover, the fan casing 211 further comprises a blocking member 217 provided at the guiding outlet 2114 for preventing air in the fan casing 211 from flowing back to the receiving cavity 2115 when air is drawn to pass through the guiding outlet 2114 when the fan blades 212 are rotating.

Figure 16:
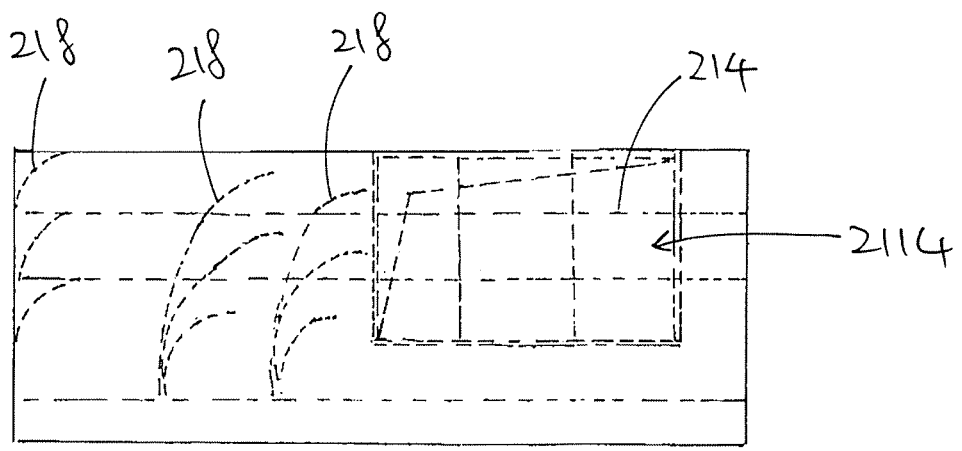
FIG. 16 is a plan view of the indoor fan unit of the fan assembly of the window-type air conditioning system according to the first preferred embodiment of the present invention.

Referring to FIG. 16 of the drawings, the indoor fan unit 21 further comprises a plurality of air guiders 218 spacedly and vertically extended in the air channels 215 for guiding the air drawn from the fan blades 212 to evenly flow in the air channels 215 along a longitudinal direction thereof. Each of the air guiders 218 has a curved contour and is vertically extended in the corresponding air channel 215 for guiding the air to flow evenly along each air channel 215. Since air passes through the air channels 215 in a substantially even flow rate, the noise produced can be minimized.

Figure 17:
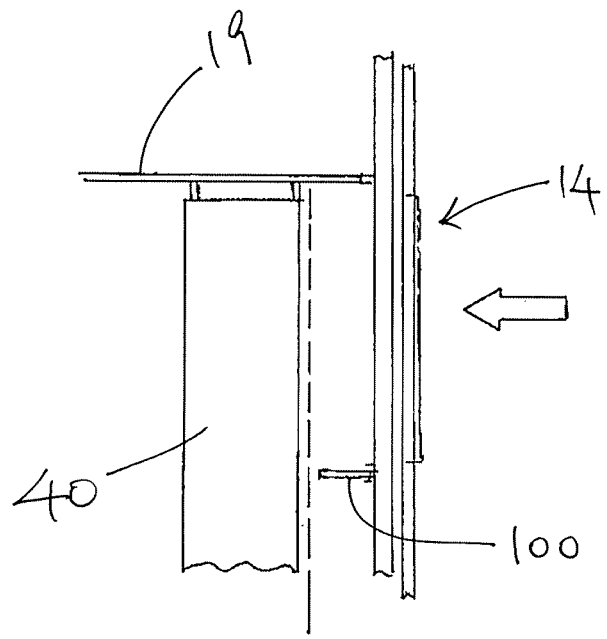
FIG. 17 is a schematic diagram of the outer housing of the window-type air conditioning system according to the first preferred embodiment of the present invention, illustrating the structure near one side air inlet.

Referring to FIG. 17 of the drawings, the window-type air conditioning system further comprises a plurality of separating members 100 detachably mounted on the outer housing 10 at a position adjacent to the side air inlets 14 for guiding air to pass through the corresponding side portion 41 of the evaporator unit 40 when air is drawn to enter the outer housing 10 through the side air inlets 14. Each of the separating members 100 extends from the outer housing 10 to the corresponding side portion 41 of the evaporator unit 40 so as to guide the air coming from the corresponding side air inlet 14 to flow through the side portion 41 of the evaporator unit 40 without escaping to other spaces in the outer housing 10. In other words, the separating member 100, the partitioning member 19, and the evaporator unit 40 form a confined space for forcing the flow of air from the corresponding side air inlet 14 to the evaporator unit 40 without allowing the air to escape to the other spaces in the outer housing 10.

Figure 18:
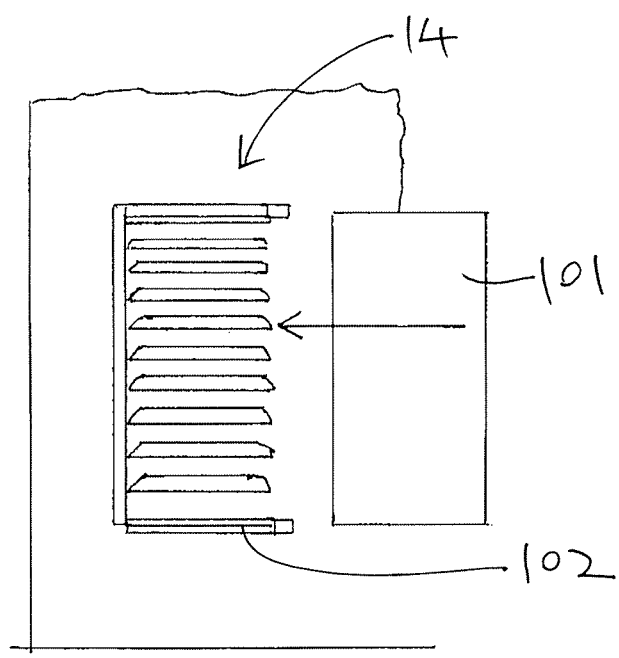
FIG. 18 is a schematic diagram of the outer housing of the window-type air conditioning system according to the first preferred embodiment of the present invention, illustrating the side air inlet can be selectively closed.

Referring to FIG. 18 of the drawings, the window-type air conditioning system further comprises a plurality of covering members 101 detachably attached on the outer housing 10 to selectively cover the side air inlets 14 respectively. In the first preferred embodiment of the present invention, the covering members 101 are slidably attached on the outer housing 10 through a plurality of tracks 102. When at least one of the side air inlets 14 is blocked by the building structure on which the window-type air conditioning system is mounted, the covering member 101 may be slid along the corresponding tracks 102 to cover the corresponding side air inlet 14.

Figure 19:
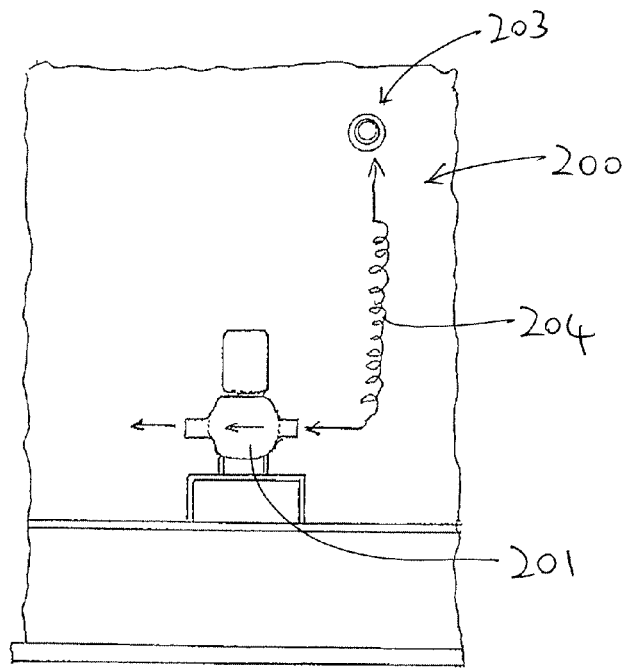
FIG. 19 is a water supply arrangement of the window-type air conditioning system according to the first preferred embodiment of the present invention.

Referring to FIG. 19 of the drawings, the window-type air conditioning system further comprises a water supply arrangement 200 which comprises a water controller 201 provided on the outer housing 10, a water supply pipe 202 extended from the water controller 201 for supplying water to a designated location in the outer housing 10. The water supply arrangement 200 further comprises a supply water outlet 203 provided on the outer housing 10, and a flexible water pipe 204 extended between the water controller 201 and the supply water outlet 203.

Figure 20:
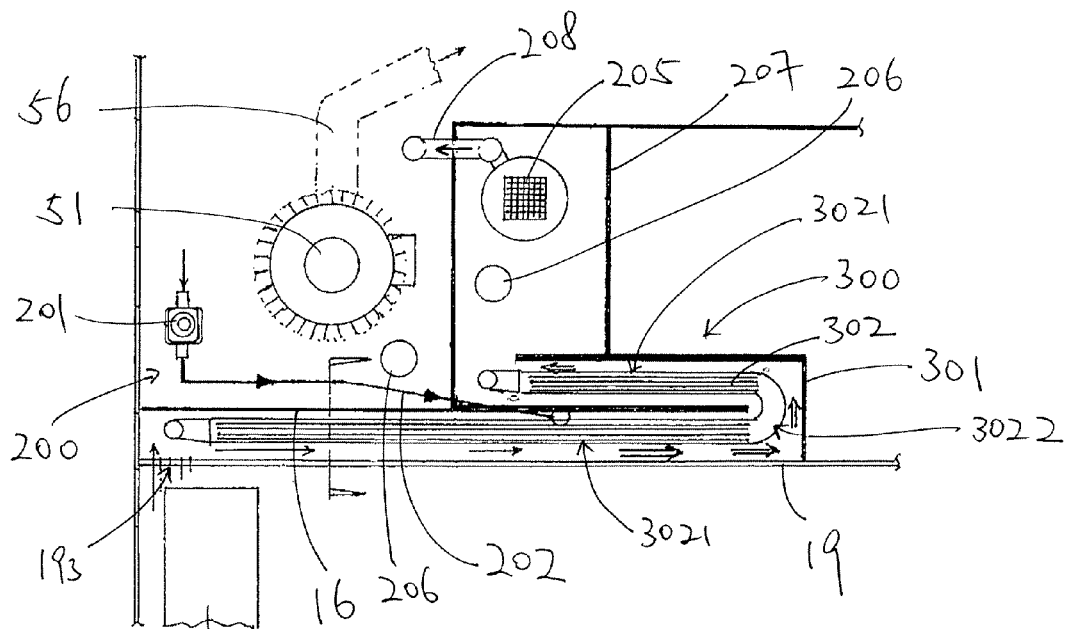
FIG. 20 is a water supply arrangement of the window-type air conditioning system according to the first preferred embodiment of the present invention, illustrating that the water supplying arrangement may be used to supply water to compensate water loss in the window-type air conditioning system.
Figure 22:
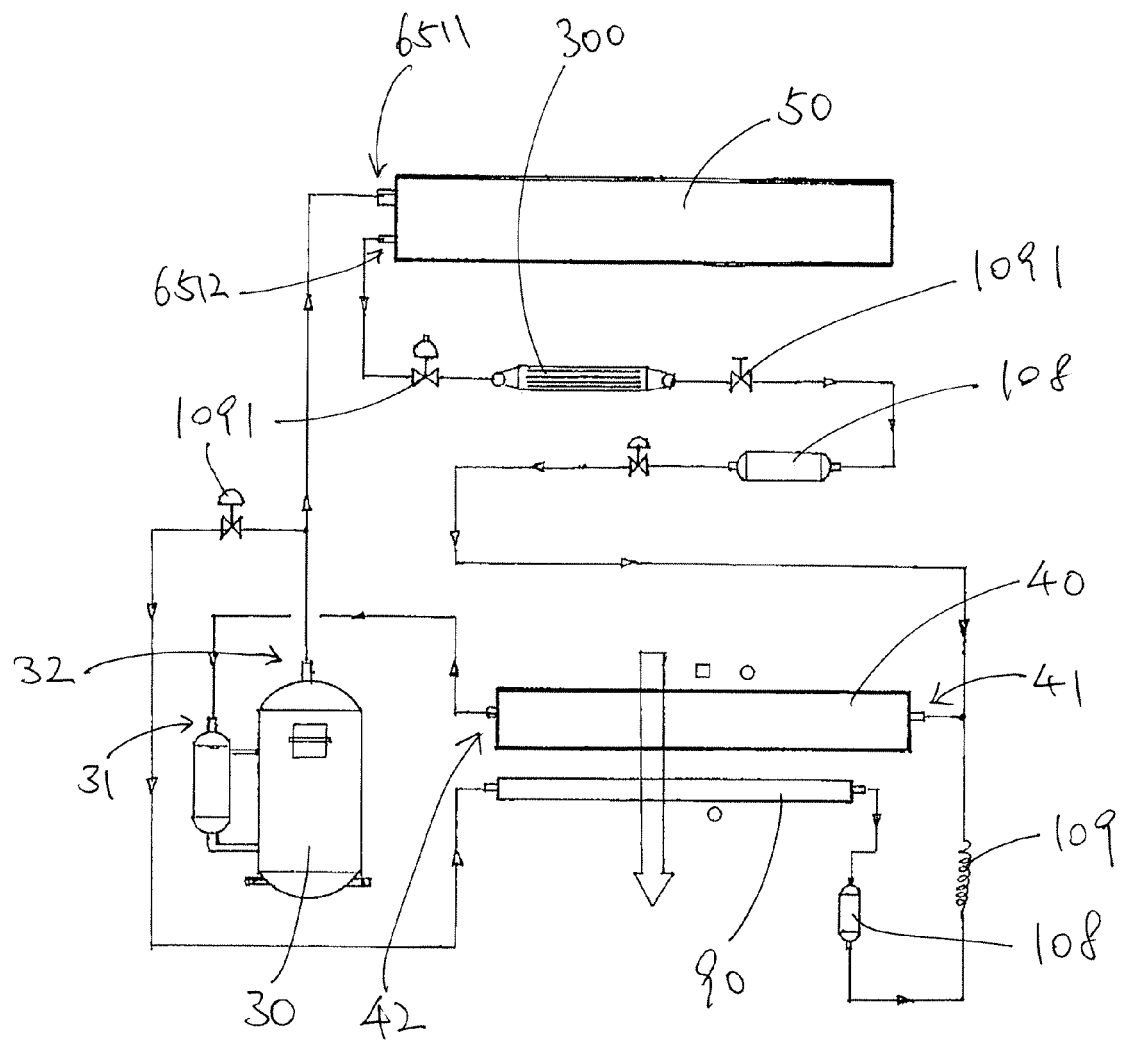
FIG. 22 is a schematic flow diagram of the window-type air conditioning system according to the first preferred embodiment of the present invention, illustrating the flowing route of the refrigerant.

Referring to FIG. 6, FIG. 20 and FIG. 22 of the drawings, the window-type air conditioning system further comprises an energy efficient cooling unit 300 connected between the water cooling unit 50 and the evaporator unit 40. The refrigerant leaving the water cooling unit 50 is arranged to be further cooled by the energy efficient cooling unit 300. The energy efficient cooling unit 300 comprises a cooling tank 301 provided in the outer casing 10 for storing a predetermined amount of water, and a cooling pipe 302 immersed in the cooling tank 301. The cooling pipe 302 is structurally identical to the heat exchanging pipes of the water cooling unit 50 as described above for performing heat exchanging with the water stored in the cooling tank 301. One end of the cooling pipe 302 is connected to the water cooling unit 50. Another end of the cooling pipe 302 is connected to the evaporator unit 40. According to the preferred embodiment of the present invention, the cooling pipe 302 has two longitudinal portions 3021 and a curved portion 3022 integrally connecting the two longitudinal portions 3021.

The cooling tank 301 is to be filled with water for performing heat exchange with the refrigerant flowing through the cooling pipe 302. The water that is to be filled in the cooling tank 301 come from two separate sources, the first source being the water drawn by the water supply arrangement 200. As shown in FIG. 20 of the drawings, the water drawn by the water supply arrangement 200 is guided to flow into the cooling tank 301 at position at one of the longitudinal portions 3021 of the cooling pipe 302. Note that the temperature of the water drawn by the water supply arrangement 200 is approximately 22° C. to 26° C. In this preferred embodiment, the cooling tank 301 is communicated to the water supply pipe 202 so that incoming water can be guided to flow into the cooling tank 301 through the water supply pipe 202 for lowering the temperature of the cooling pipe 302.

On the other hand, the second source of the water comes from water collection in the evaporator unit 40. When the evaporator unit 40 is operating, water droplets are typically formed on an external surface of the evaporator unit 40. These water droplets fall and are collected to become a predetermined volume of condensed water. The amount of water is then guided to flow into the cooling tank 301 through a passage channel 193 of the partitioning member 19. The temperature of the condensed water from the evaporator unit 40 is approximately 10° C.

It is worth mentioning the refrigerant and the water in the cooling water pipe 302 are guided to flow in opposite direction so as to maximize the heat exchange performance between the water in the cooling tank 301 and the refrigerant flowing through the cooling pipe 302.

The water supply arrangement 200 further comprises a water supplying pump 205 provided in a water supplying tank 207 which is provided adjacent to the water tank 16 and the cooling tank 301. The water flowing in the cooling tank 301 is arranged to be guided to flow into the water supplying tank 207 and eventually go to the water tank 16. The water supply arrangement 200 further comprises a plurality of water level sensors 206 provided in the water tank 16 and the water supplying tank 207 respectively. When the water level sensor 206 in the water tank 16 detects that the water level therein falls below a predetermined threshold, this water level sensor 206 is arranged to send a signal to activate the water controller 201 for allowing it to draw water from an external water source. The water guided to flow into the cooling tank 301 as described above. The water contained in the cooling tank 301 is guided to flow into the water supplying tank 207 in which the other water level sensor 206 is located. As a result, the water in the water supplying tank 207 increases. When the water level sensor 206 in the water supplying tank 207 detects that the water level reaches a predetermined threshold, the water level sensor 206 is arranged to send a signal to the water supplying pump 205 for pumping the water in the water supplying tank 207 to flow into the water tank 16, preferably via a water delivering pipe 208. As a result, the water in the water tank 16 gradually increases to compensate for loss of water therein (due to evaporation of the cooling water when it passes through the water cooling unit 50).

Figure 21:
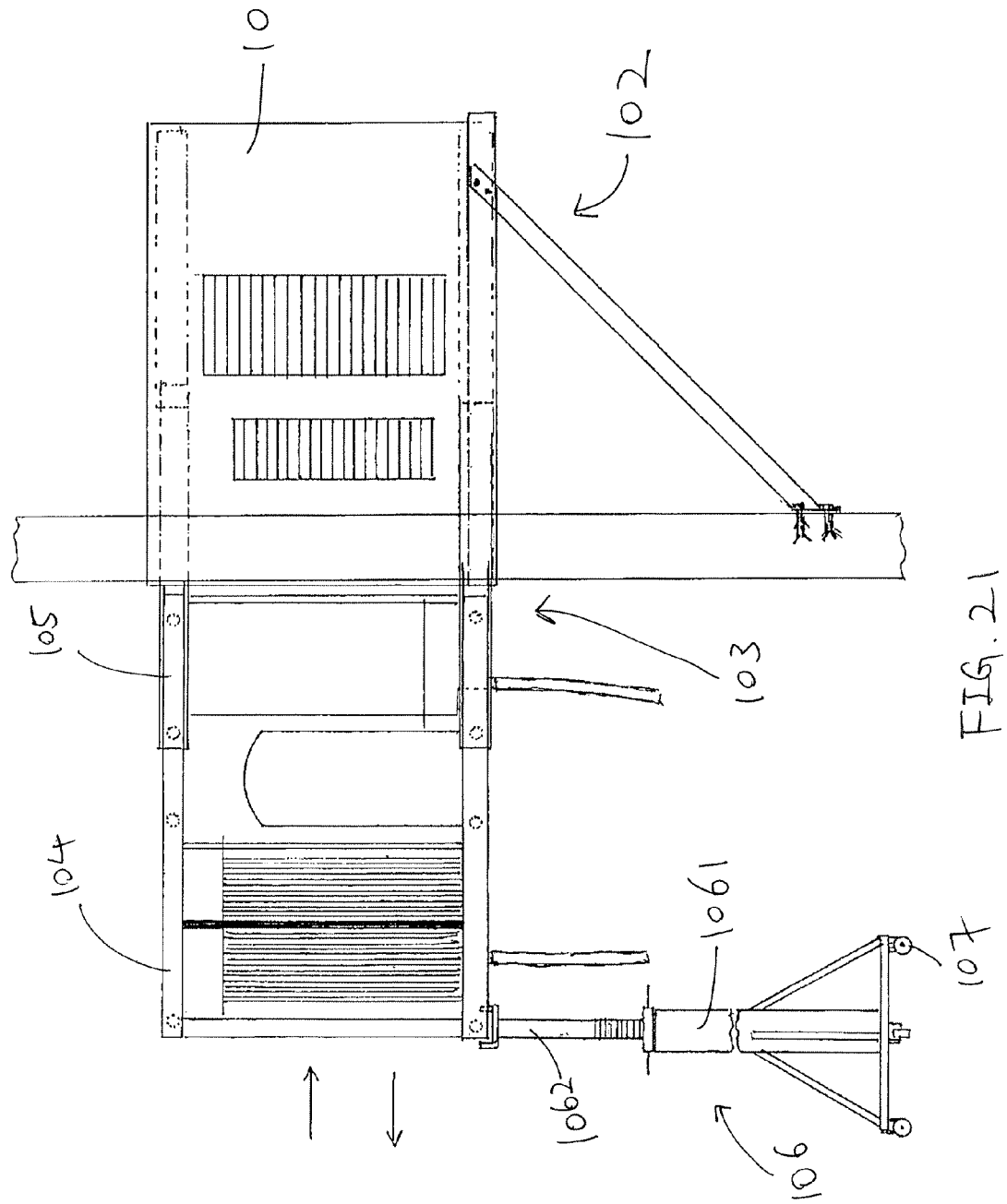
FIG. 21 is a schematic diagram of a maintenance arrangement of the window-type air conditioning system according to the first preferred embodiment of the present invention.

Referring to FIG. 21 of the drawings, the window-type air conditioning system further comprises maintenance arrangement 102 which comprises a sliding supporting frame 103 operatively mounted on the outer housing 10 for allowing a user to conveniently access the various components of the window-type air conditioning system. Specifically, the sliding supporting frame 103 comprises an inner supporting frame 104 supporting all of the above-mentioned components of the window-type air conditioning system except the outer housing 10, and a plurality of sliding tracks 105 mounted between the inner supporting frame 104 and the outer housing 10 for slidably connecting the outer housing 10 with the inner supporting frame 104. As a result, the inner supporting frame 104, which supports all the components of the window-type air conditioning system, is capable of sliding with respect to the outer housing 10. When the window-type air conditioning system needs cleaning or maintenance, a technician may slide the inner supporting frame 104 out from the outer housing 10 and perform the necessary maintenance, as shown in FIG. 21 of the drawings.

Moreover, the maintenance arrangement further comprises an adjustable reinforcing frame 106 detachably attached on a bottom side of the inner supporting frame 104 in such a manner that when the inner supporting frame 104 is slid out from the outer housing 10, the adjustable reinforcing frame 106 may be attached on the bottom side of the inner supporting frame 104 for providing additional support to the inner supporting frame 104. Note that a height of the adjustable reinforcing frame 106 can be adjusted while a plurality of wheels 107 is attached on a bottom surface of the adjustable reinforcing frame 106 so that it can slide along a ground surface for supporting the inner supporting frame 104. The adjustable reinforcing frame 106 comprises a lower frame member 1061 and an upper frame member 1062 adjustably supported by the lower frame member 1061, wherein the upper frame member 1062 is detachably attached to the inner supporting frame 104, while the lower frame member 1061 is rotatably supported by the wheels 107 on the ground surface.

Referring to FIG. 22 of the drawings, the window-type air conditioning system according to the first preferred embodiment of the present invention further comprises a plurality of drying filters 108, an expansion valve 109, and a plurality of two-way valves 1091. As shown in FIG. 22 of the drawings, the compressor unit 30 is connected to the water cooling unit 50, which is also connected to the evaporator unit 40 and the dehumidifying heat exchanger 90 through the expansion valves 109, the drying filter 108, and the energy efficient cooling unit 300.

The compressor unit 30 has a compressor inlet 31 connected to the evaporator unit 40, a compressor outlet 32 connected to the fluid inlet 6511 of the water cooling unit 50 and the dehumidifying heat exchanger 90.

The evaporator unit 40 has a first evaporator port 41 connected to the fluid outlet 6512 of the water cooling unit 50 and the dehumidifying heat exchanger 90, and a second evaporator port 42 connected to the compressor inlet 31 of the compressor unit 30. The evaporator unit 40 is arranged to perform heat exchange between the refrigerant and air in the indoor space for extracting heat from the indoor space.

The refrigerant is arranged to circulate between the various components of the window-type air conditioning system for air conditioning. Superheated refrigerant leaves the compressor unit 30 through the compressor outlet 32 and is bifurcated into a first refrigerant stream and a second refrigerant stream. The first refrigerant stream enters the water cooling unit 50 through the fluid inlet 6511. The refrigerant is then cooled and condensed by the cooling water in the water cooling unit 50 in the manner described above. The first refrigerant stream in a liquid state leaves the water cooling unit 50 through the fluid outlet 6512 and is guided to pass through a two-way valve 1091, the energy efficient cooling unit 300, another two-way valve 1091, a drying filter 108, another two-way valve 1091, and eventually merges with the second refrigerant stream and enters the evaporator unit 40 (described below). The refrigerant in the evaporator unit 40 is arranged to absorb heat from the indoor space. The refrigerant then leaves the evaporator 40 through the second evaporator port 42 and flows back to the compressor unit 30 through the compressor inlet 31.

On the other hand, the second refrigerant stream is guided to enter the dehumidifying heat exchanger 90 for dehumidifying the indoor space. The refrigerant then leaves the dehumidifying heat exchanger 90 and passes through a drying filter 108 and an expansion valve 109, and merges with the first refrigerant stream. The merged refrigerant streams then enter the evaporator unit 40 as described above.

Figure 23:
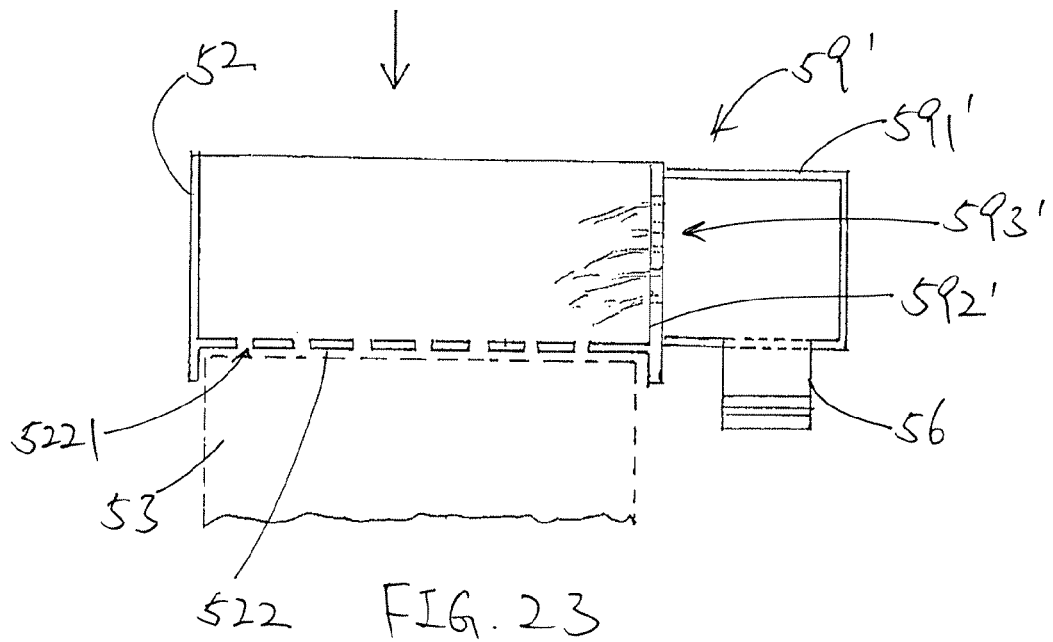
FIG. 23 is a first alternative mode of the window-type air conditioning system according to the first preferred embodiment of the present invention, illustrating an alternative configuration of the water distributor.

Referring to FIG. 23 of the drawings, a first alternative mode of the window-type air conditioning system according to the preferred embodiment of the present invention is illustrated. The first alternative mode is similar to the first preferred embodiment, except the water distributor 59' and the guiding arrangement 60'. According to the first alternative mode, the water distributor 59' comprises a water storage tank 591' having a water distributing sidewall 592', and contains a plurality of water distributing slots 593' evenly formed on the water distributing sidewall 592'. The water storage tank 591' is communicated with the cooling water pipe 56. The cooling water is temporarily stored in the water storage tank 591'. The water stored in the water storage tank 591' is arranged to pass through the water distributing sidewall 592' through the water distributing slots 593' and reaches the top water collection basin 52.

Figure 24:
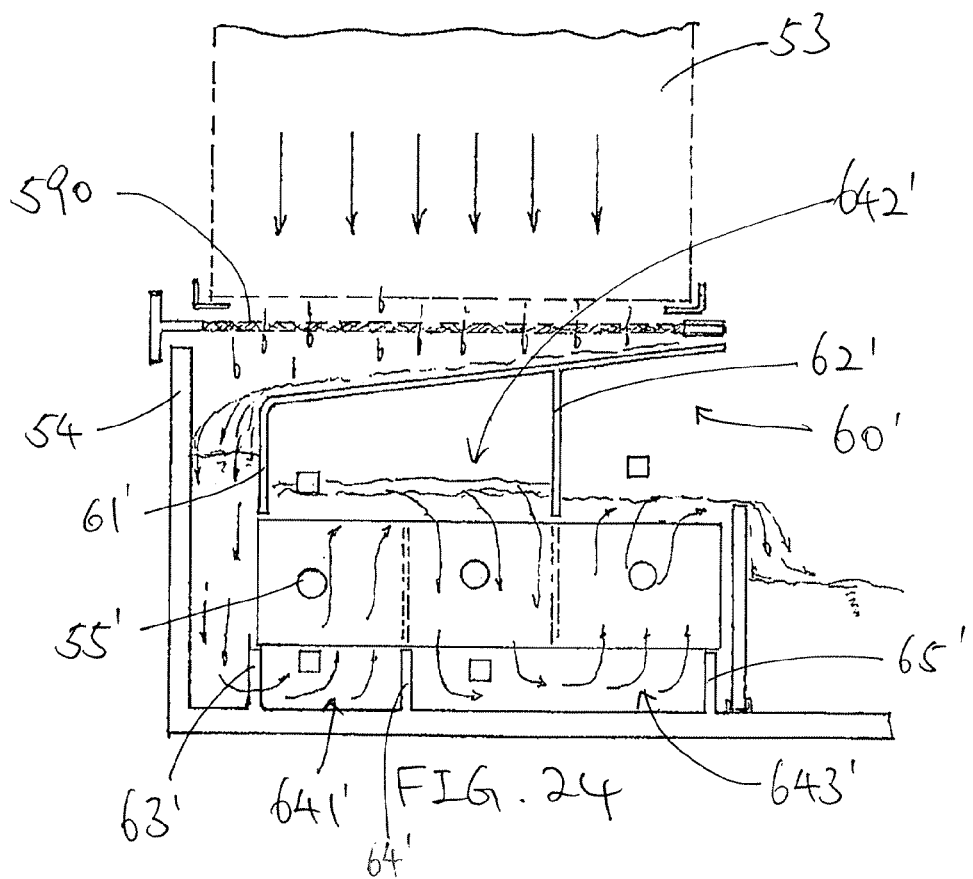
FIG. 24 is a first alternative mode of the window-type air conditioning system according to the first preferred embodiment of the present invention, illustrating an alternative configuration of the guiding arrangement.

Referring to FIG. 24 of the drawings, the guiding arrangement 60' has first through third heat exchanging chamber 641', 642', 643' formed by a first vertical guiding member 61', a second vertical guiding member 62', a third vertical guiding member 63', a fourth vertical guiding member 64', and a fifth vertical guiding member 65', while the heat exchanging pipes 55' are divided into three piping groups, which are accommodated in the three heat exchanging chambers 641', 642', 643' respectively. It is important to mention at this point that the number of heat exchanging pipes 55', the number of piping groups, and the number of heat exchanging chambers may be varied depending on the circumstances in which the present invention is operated.

Figure 25:
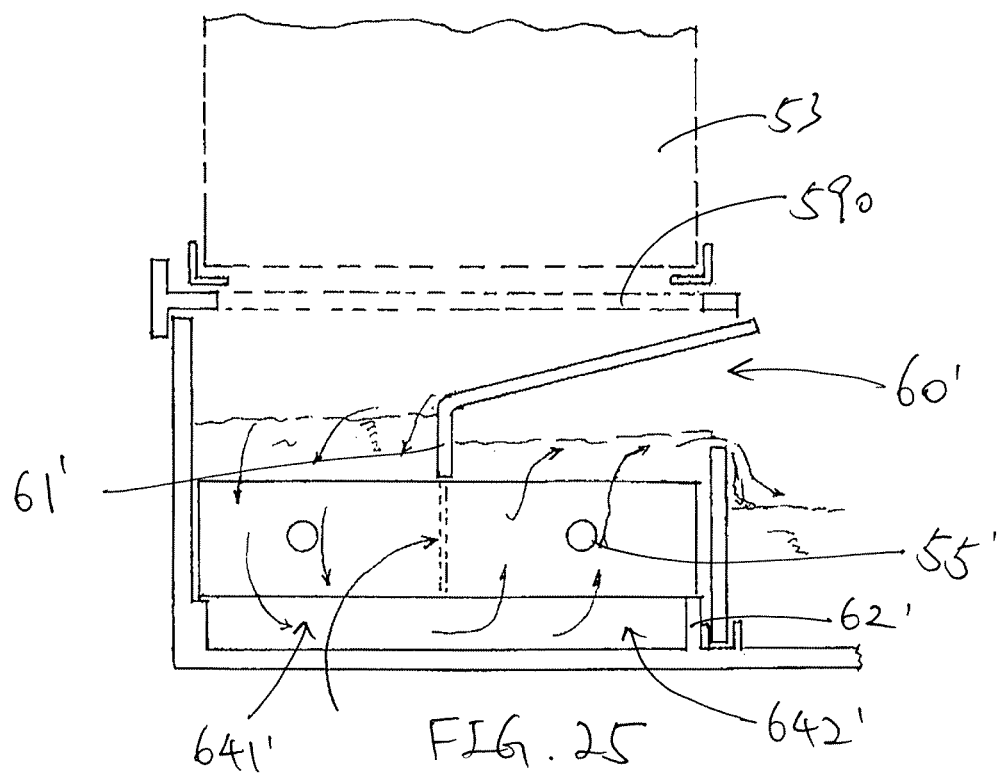
FIG. 25 is a first alternative mode of the window-type air conditioning system according to the first preferred embodiment of the present invention, illustrating another alternative configuration of the guiding arrangement.
Figure 26:
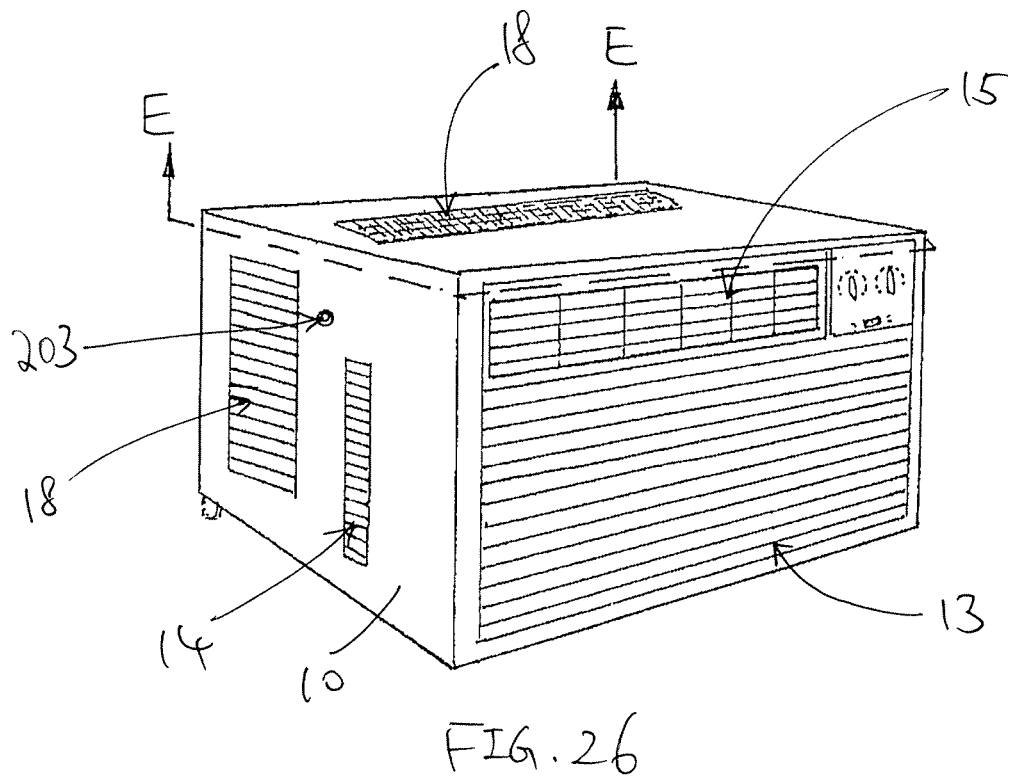
FIG. 26 is a perspective view of the window-type air conditioning system according to a second preferred embodiment of the present invention.

An example variation is shown in FIG. 25 of the drawings, in which the guiding arrangement 60' has only two heat exchanging chambers 641', 642' formed by a two vertical guiding member 61', 62', while the heat exchanging pipes 55' are divided into two piping groups.

Referring to FIG. 26 to FIG. 33 of the drawings, a window-type air conditioning system according to a second preferred embodiment of the present invention is illustrated. The second preferred embodiment is similar to the first preferred embodiment described above, except that the window-type air conditioning system in the second preferred embodiment can also act as a heat pump system.

Thus, in addition to the components described in the first preferred embodiment above, the window-type air conditioning system further comprises an outdoor heat exchanger 400", a humidifying device 500", a first connecting valve 600", a second connecting valve 700", a heat pump cooling device 800", and a switching circuitry 900".

Figure 27:
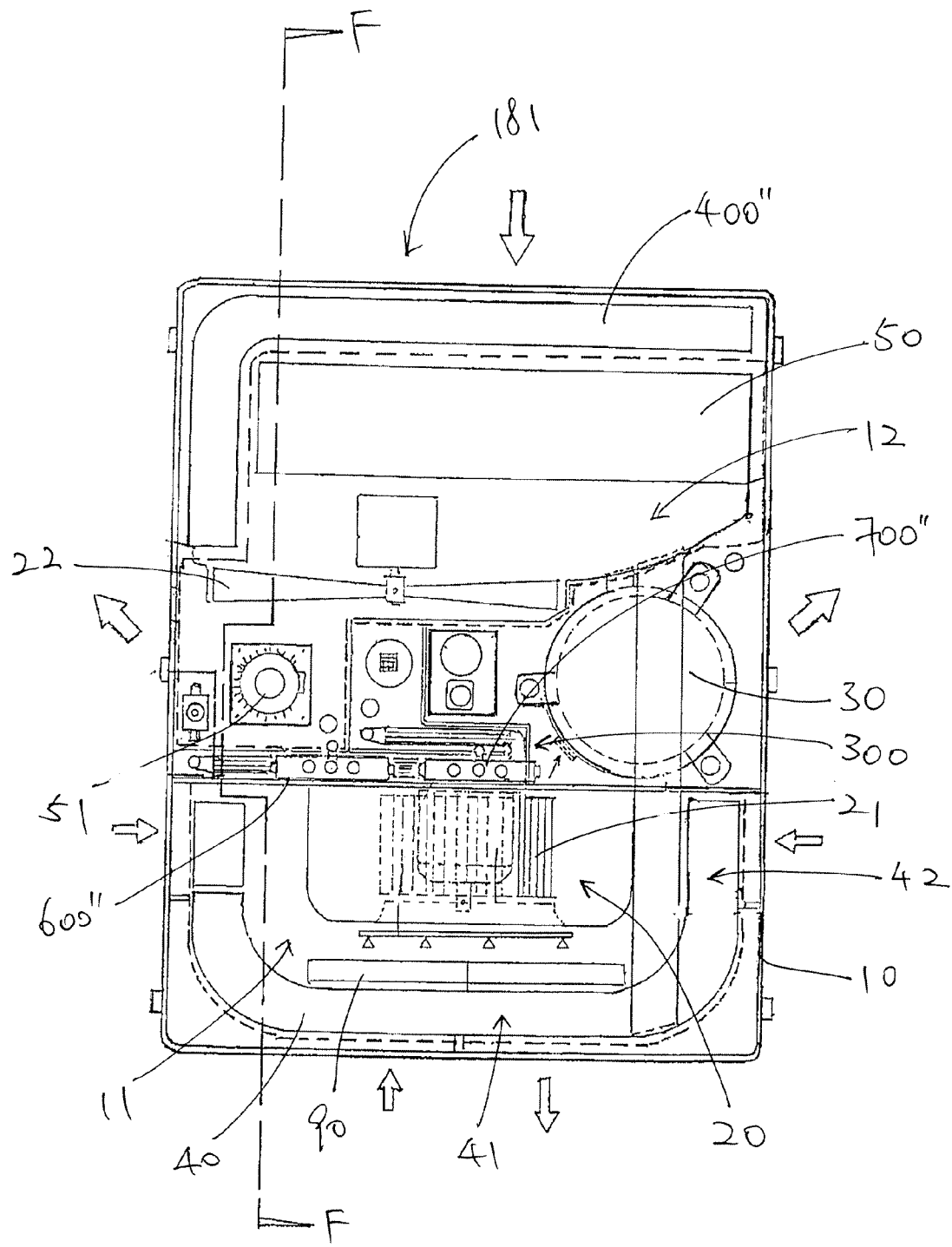
FIG. 27 is a sectional view of the window-type air conditioning system along plane E-E of FIG. 26.
Figure 28:
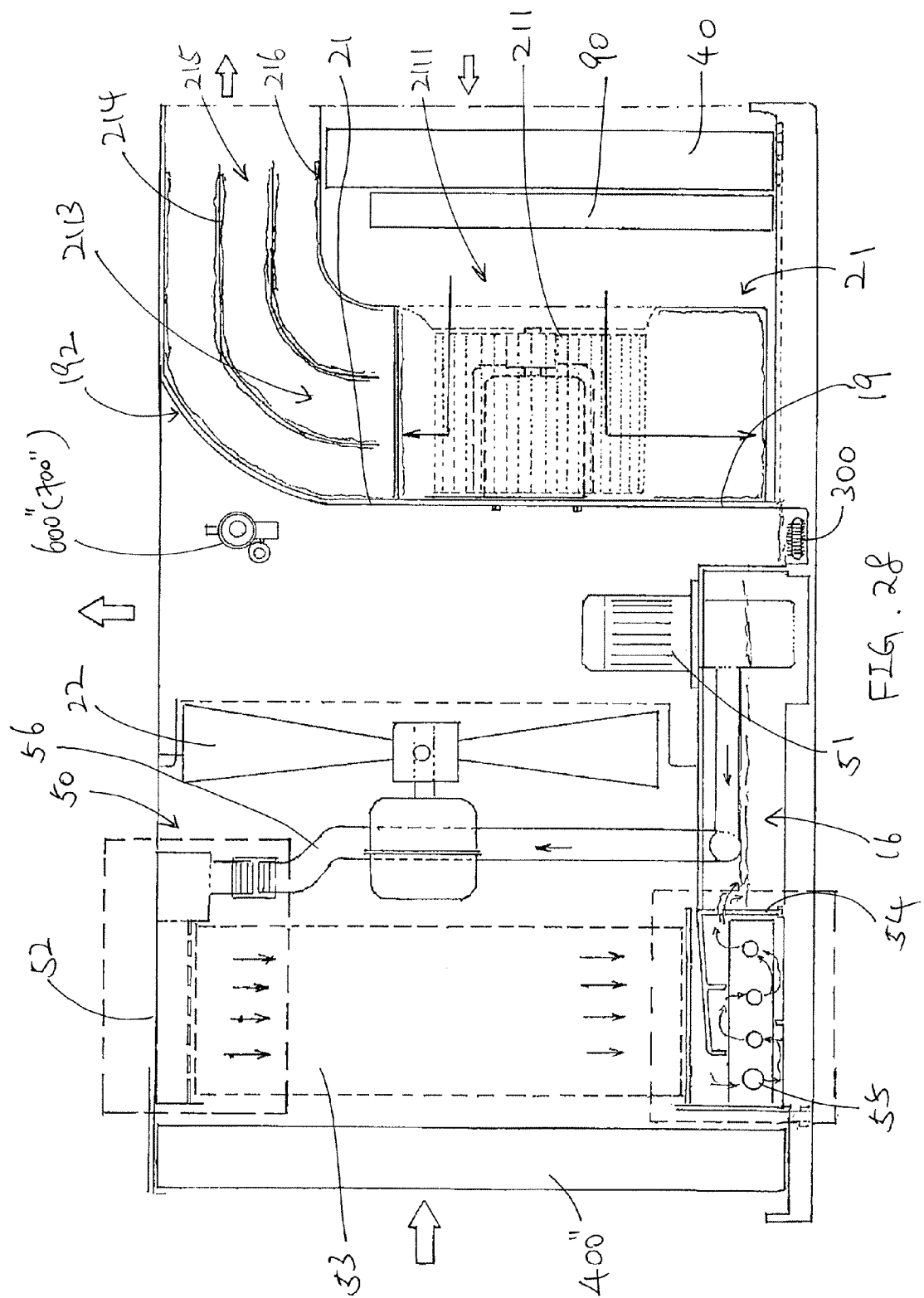
FIG. 28 is a sectional view of the window-type air conditioning system along plane F-F of FIG. 27.
Figure 30:
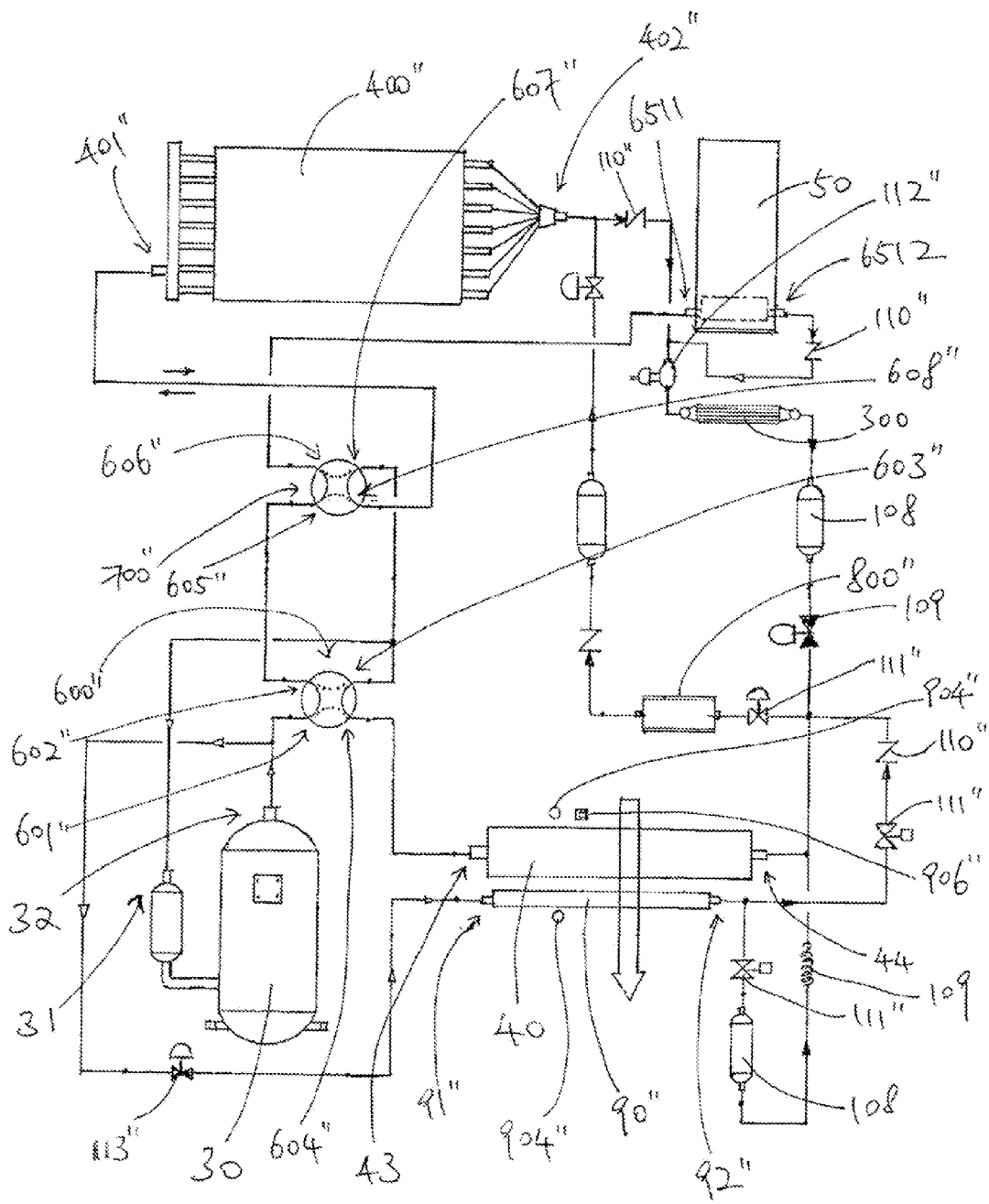
FIG. 30 is a schematic diagram of the various components of the window-type air conditioning system according to the second preferred embodiment of the present invention, illustrating the flowing route of the refrigerant.

Referring to FIG. 27 and FIG. 30 of the drawings, the outdoor heat exchanger 400" is supported in the outdoor compartment 12 of the outer casing 10. The outdoor heat exchanger 400" has an L-shaped cross section and is extended at a rear portion and a side portion of the outer casing 10. The water cooling unit 50 is positioned between the outdoor heat exchanger 400" and the outdoor fan unit 22. In other words, air drawn from the ambient environment is guided to first pass through the outdoor heat exchanger 400" first and then to the water cooling unit 50. The outdoor heat exchanger 400" can be selectively used as an evaporator or a condenser (described below).

The first connecting valve 600" and the second connecting valve 700" are provided in the outdoor compartment 12 of the outer casing 10, and are connected between the compressor unit 30, the outdoor heat exchanger 400", the water cooling unit 50, and the evaporator unit 40 for guiding the flowing path of the refrigerant.

Each of the first and the second connecting valve 600", 700" may operate between a normal mode and a switched mode. For the first connecting valve 600", it has first through fourth connecting port 601", 602", 603", 604". When the first connecting valve 600" is in the normal mode, the first connecting port 601" is connected to the second connecting port 602" while the third connecting port 603" is connected to the fourth connecting port 604". When the first connecting valve 600" is in the switched mode, the first connecting port 601" is connected to the fourth connecting port 604" while the second connecting port 602" is connected to the third connecting port 603".

For the second connecting valve 700", it has fifth through eighth connecting port 605", 606", 607", 608". When the second connecting valve 700" is in the normal mode, the fifth connecting port 605" is connected to the sixth connecting port 606" while the seventh connecting port 607" is connected to the eighth connecting port 608". When the second connecting valve 700" is in the switched mode, the fifth connecting port 605" is connected to the eighth connecting port 608" while the sixth connecting port 606" is connected to the seventh connecting port 607".

According to the second preferred embodiment of the present invention, the window-type air conditioning system of the present invention may selectively operate between an air conditioning mode (for delivering cooled air in an indoor space), a heat pump mode (for delivering warm air in the indoor space), and a defrosting mode.

Referring to FIG. 30 of the drawings, the compressor outlet 32 is connected to the first connecting port 601" of the first connecting valve 600" and a first dehumidifying port 91" of the dehumidifying heat exchanger 90". The compressor inlet 31 is connected to the third connecting port 603" of the first connecting valve 600", and the seventh connecting port 607" of the second connecting valve 700".

For the first connecting valve 600", the second connecting port 602" is connected to the fifth connecting port 605" while the third connecting port 603" is connected to the seventh connecting port 607" and the compressor inlet 31. The fourth connecting port 604" is connected to a first evaporator port 43 of the evaporator unit 40.

For the second connecting valve 700", the sixth connecting port 606" is connected to the fluid inlet 6511 of the water cooling unit 50, while the eighth connecting port 608" is connected to the first heat exchanger port 401" of the outdoor heat exchanger 400".

The outdoor heat exchanger 400" further has a second heat exchanger port 402" connected to the fluid outlet 6512 of the water cooling unit 50, the energy efficient cooling unit 300, and the heat pump cooling device 800".

The evaporator unit 40 further has a second evaporator port 44 connected to the energy efficient cooling unit 300, the heat pump cooling device 800", and a second dehumidifying port 92" of the dehumidifying heat exchanger 90".

Figure 29:
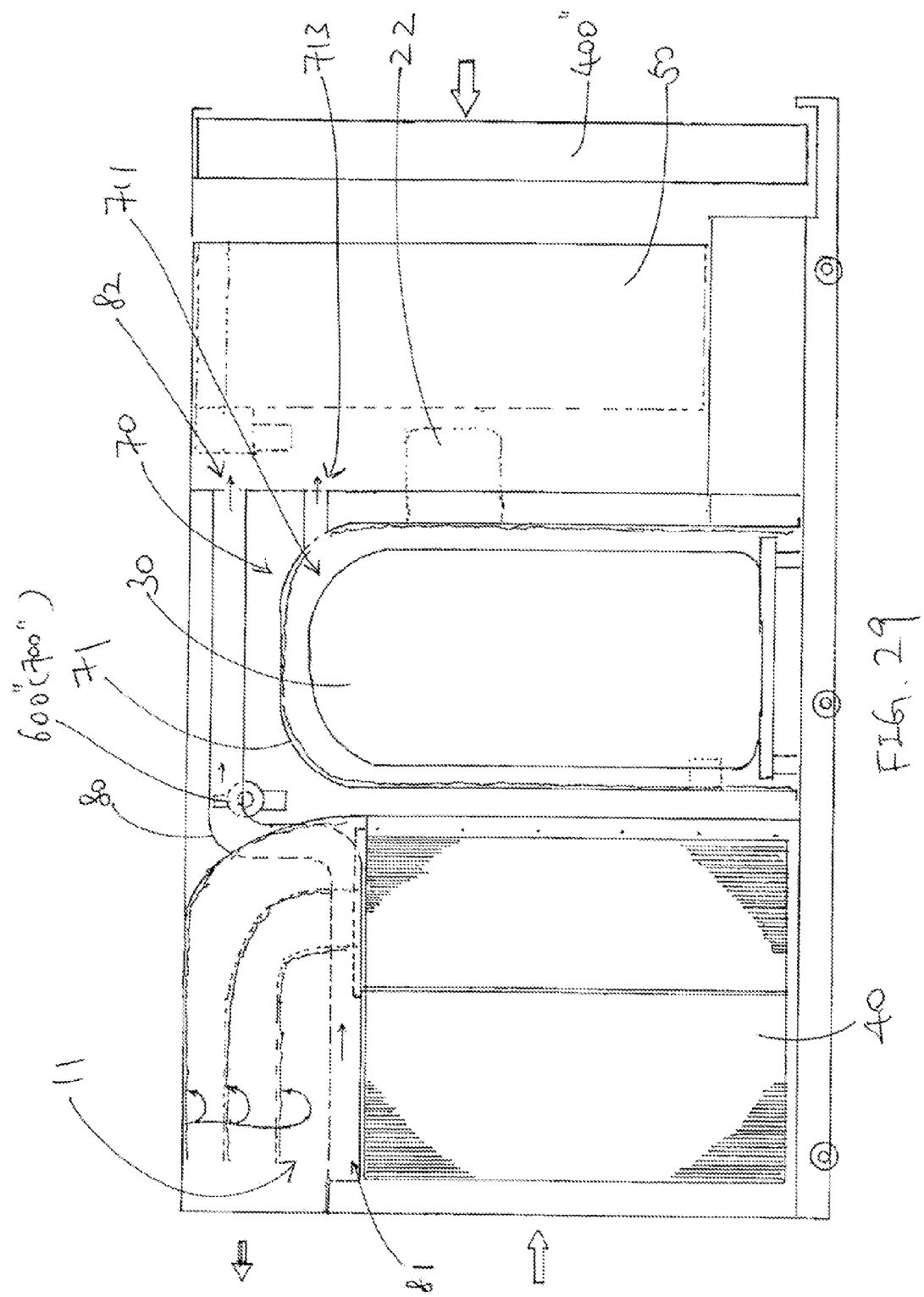
FIG. 29 is a side view of the window-type air conditioning system according to the second preferred embodiment of the present invention.

Furthermore, the window-type air conditioning system further comprises a plurality of unidirectional valves 110", a plurality of two-way valves 111", and a controller valve 112" connected to the various components of the window-type air conditioning system as shown in FIG. 29 of the drawings.

When the window-type is in the air conditioning mode, the first connecting valve 600" and the second connecting valve 700" are all in the normal mode. Superheated or vaporous refrigerant leaves the compressor unit 30 and flows through the first connecting port 601" of the first connecting valve 600". The refrigerant then flows through the second connecting port 602", the fifth connecting port 605" of the second connecting valve 700", the sixth connecting port 606" of the second connecting valve 700" and enters the water cooling unit 50 through the fluid inlet 6511. The refrigerant is then cooled by the cooling water in the water cooling unit 50 in the manner described above. The refrigerant then leaves the water cooling unit 50 through the fluid outlet 6512 and passes through a unidirectional valve 110", a controller valve 112", and enters the energy efficient cooling unit 300. The refrigerant is then further cooled by the energy efficient cooling unit 300 and passes through a drying filter 108, an expansion valve 109, and is guided to enter the evaporator unit 40 through the second evaporator port 44. The refrigerant then absorbs heat from the indoor space and leaves the evaporator unit 40 through the first evaporator port 43. The refrigerant is then guided to pass through the fourth connecting port 604" of the first connecting valve 600", the third connecting port 603", and goes back to the compressor unit 30 through the compressor inlet 31". This completes one flowing cycle of the refrigerant.

It is worth mentioning that when the window-type air conditioning system is in the air conditioning mode, the outdoor heat exchanger 400" is idle. Thus residual refrigerant contained in the outdoor heat exchanger 400" is guided to leave the outdoor heat exchanger 400" through the first heat exchanger port 401" and pass through the eighth connecting port 608", the seventh connecting port 607", and finally goes back to the compressor unit 30 through the compressor inlet 31.

When the window-type air conditioning system is in the heat pump mode, the first connecting valve 600" and the second connecting valve 700" are all in the switched mode. Superheated or vaporous refrigerant leaves the compressor unit 30 through the compressor outlet 32. The refrigerant is bifurcated into a first and a second refrigerant stream. The first refrigerant stream is guided to flow through the first connecting port 601", and the fourth connecting port 604" of the first connecting valve 600". The first refrigerant stream is then guided to flow into the evaporator unit 40 through the first evaporator port 43 for releasing heat to the indoor space. The first refrigerant stream then leaves the evaporator unit 40 through the second evaporator port 44.

On the other hand, the second refrigerant stream is guided to flow into the dehumidifying heat exchanger 90" through the first dehumidifying port 91". The second refrigerant stream then leaves the dehumidifying heat exchanger 90" through the second dehumidifying port 92" and is guided to pass through a two-way valve 111", a unidirectional valve 110", and merge with the first refrigerant stream. The refrigerant (merged refrigerant stream) is then guided to pass through another two-way valve 111" and enter the heat pump cooling device 800". The refrigerant is cooled in the heat pump cooling device 800". The refrigerant goes on to pass through a unidirectional valve 110", a drying filter 108, an expansion valve 109, and enter the outdoor heat exchanger 400" through the second heat exchanger port 402" for absorbing heat from the surrounding environment. The refrigerant then leaves the outdoor heat exchanger 400" through the first heat exchanger port 401" and pass through the eighth connecting port 608" and the fifth connecting port 605" of the second connecting valve 700". The refrigerant then passes through the second connecting port 602" and the third connecting port 603" of the first connecting valve 600". The refrigerant finally goes back to the compressor unit 30 through the compressor inlet 31.

When the window-type air conditioning system is in the heat pump mode, the water cooling unit 50 is idle. Residual refrigerant contained in the water cooling unit 50 is guided to leave the water cooling unit 50 through the first fluid inlet 6511. The refrigerant is then guided to pass through the sixth connecting port 606" and the seventh connecting port 607" of the second connecting valve 700". Finally, the residual refrigerant goes back to the compressor unit 30 through the compressor inlet 31.

Figure 31:
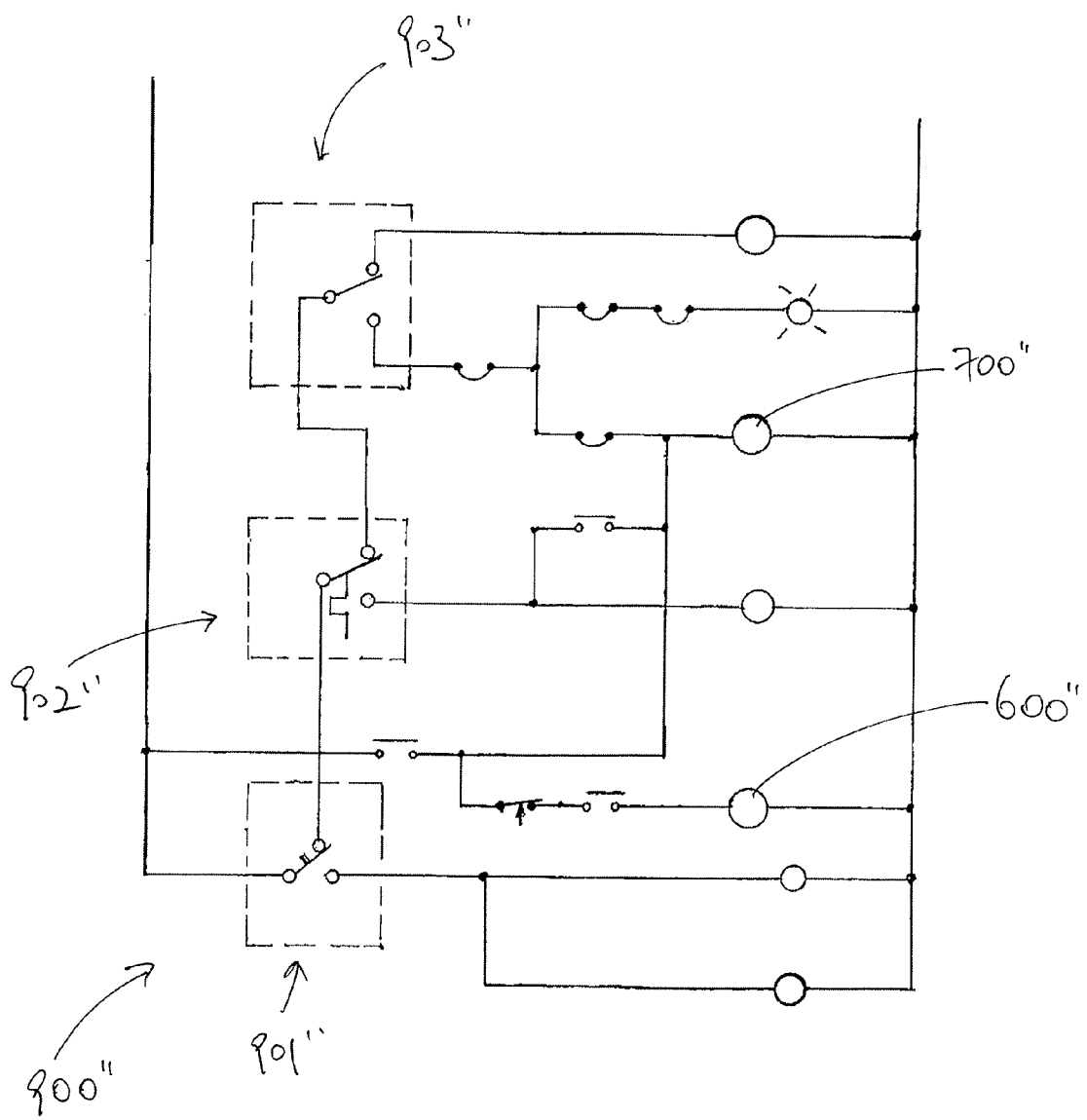
FIG. 31 is a schematic diagram of a switching circuitry of the window-type air conditioning system according to the second preferred embodiment of the present invention.

When the window-type air conditioning system is in the air conditioning mode, the window-type air conditioning system may be switched between an air-cooled status and a water-cooled status. When the window-type air conditioning system is in the water-cooled status, the refrigerant is cooled by the water cooling unit 50 as described above. However, when the window-type air conditioning system is in the air-cooled status, the refrigerant will be cooled by the outdoor heat exchanger 400". Accordingly, the window-type air conditioning system further comprises a switching arrangement 900" for controlling the switching between the air-cooled status and the water-cooled status. The switching arrangement 900" is electrically connected to the first connecting valve 600" and the second connecting valve 700", and is illustrated in FIG. 31 of the drawings.

The switching arrangement 900" comprises a mode selection switch 901", a status selection switch 902", a water level switch 903", a temperature sensor 904" provided on the outer housing 10 and is electrically connected to the status selection switch 902", and a water level sensor 206 electrically connected to the water level switch 903". Each of the mode selection switch 901", the status selection switch 902", and the water level switch 903" is electrically connected to the first connecting valve 600" and the second connecting valve 700" for controlling the status of the first connecting valve 600" and the second connecting valve 700" so as to alter the flowing route of the refrigerant. The mode selection switch 901" allows a user to select which mode of operation the window-type air conditioning system is to be run.

When the temperature of the ambient environment in which the window-type air conditioning system is operated falls below a predetermined threshold (such as 27° C.), the status selection switch 902" will be activated to switch the window-type air conditioning system from the water-cooled status to the air-cooled status. Similarly, when the water level in the water cooling unit 50 is inadequate, the water level switch 903" will also be activated to switch the window-type air conditioning system from the water-cooled status to the air-cooled status. This is necessary for protecting the compressor unit 30 and the water cooling unit 50. As a result, when the temperature or the water level rises above the predetermined threshold, the status selection switch 902" will be activated to be switched back to the water-cooled status.

When the window-type air conditioning system is in the air-cooled status, the first connecting valve 600" is in the normal mode, while the second connecting valve 700" is in the switched mode. Superheated or vaporous refrigerant first leaves the compressor unit 30 through the compressor outlet 32, and passes through the first connecting port 601" and the second connecting port 602" of the first connecting valve 600". The refrigerant then goes on to pass through the fifth connecting port 605" and the eighth connecting port 608" of the second connecting valve 700". The refrigerant is then guided to enter the outdoor heat exchanger 400" through the first heat exchanger port 401". The refrigerant is cooled in the outdoor heat exchanger 400" wherein heat is extracted to ambient air. This is why this status of operation is called air-cooled status because the refrigerant is cooled by the ambient air. The refrigerant then exits the outdoor heat exchanger 400" through the second heat exchanger port 402" and passes through a unidirectional valve 110", the controller valve 112", and enters the energy efficient cooling unit 300 which further lowers the temperature of the refrigerant. The refrigerant then passes through a drying filter 108, an expansion valve 109, and enters the evaporator unit 40 through the second evaporator port 44 for absorbing heat from the indoor space. After, the refrigerant then exits the evaporator unit 40 through the first evaporator port 43 and passes through the fourth connecting port 604" and the third connecting port 603" of the first connecting valve 600". The refrigerant finally goes back to the compressor unit 30 through the compressor inlet 31.

From the above description, it can be shown that the switching between the air-cooled status and the water-cooled status can be accomplished by switching the second connecting valve 700" between the normal mode and the switched mode.

When the window-type air conditioning system is in the air-cooled status, the water cooling unit 50 is idle. Residual refrigerant is guided to leave the water cooling unit 50 through the fluid inlet 6511. The residual refrigerant is then guided to pass through the sixth connecting port 606" and the seventh connecting port 607" of the second connecting valve 700". The residual refrigerant then goes back to the compressor unit 30 through the compressor inlet 31.

The window-type air conditioning system may also be operated under a defrosting mode. When the window-type air conditioning system is in the defrosting mode, the first connecting valve 600" is in the normal mode, while the second connecting valve 700" is in the switched mode. Superheated refrigerant leaves the compressor unit 30 through the compressor outlet 32. The refrigerant then passes through the first connecting port 601" and the second connecting port 602" of the first connecting valve 600". The refrigerant then passes through the fifth connecting port 605" and the eighth connecting port 608" of the second connecting valve 700". The refrigerant is then guided to enter the outdoor heat exchanger 400" through the first heat exchanger port 401" for releasing heat to the outdoor heat exchanger 400". The released heat is used to removal frost or ice from external surfaces of the outdoor heat exchanger 400". The refrigerant then leaves the outdoor heat exchanger 400" through the second heat exchanger port 402" and is then guided to pass through a two-way valve 110", a controller valve 112" and enters the energy efficient cooling unit 300 for being cooled. The refrigerant then leaves the energy efficient cooling unit 300 and is guided to pass through a drying filter 108, ab expansion valve 109, and enters the evaporator unit 40 through the second evaporator port 44. The refrigerant absorbing heat from the evaporator unit 40 and leaves the evaporator unit 40 through the first evaporator port 43. The refrigerant is then guided to pass through the fourth connecting port 604", the third connecting port 603", and finally go back to the compressor unit 30 through the compressor inlet 31.

As shown in FIG. 30 of the drawings, the window-type air conditioning system further comprises a refrigerant regulator 113" connected between the compressor unit 30 and the dehumidifying heat exchanger 90", and a humidity sensor 906" provided on the outer housing 10 for detecting the relative humidity of the air in the indoor space. When the humidity sensor 906" detects that the air in the indoor space has a relative humidity which is above a predetermined threshold, the refrigerant regulator 113" which is essentially a two-way valve is activated for allowing the refrigerant to flow between the compressor unit 30 and the dehumidifying heat exchanger 90". In other words, when the refrigerant regulator 113" is activated, the refrigerant coming out from the compressor unit 30 is bifurcated into a first refrigerant stream and a second refrigerant stream. The first refrigerant stream undergoes the refrigerant cycle as described above for air conditioning mode. The second refrigerant stream is guided to flow into the dehumidifying heat exchanger 90" for releasing heat to the air passing through the evaporator unit 40. The dehumidifying heat exchanger 90" is arranged to slightly increase the temperature and decrease the relative humidity of the air passing through the evaporator unit 40. The temperature sensor 904" is used to detect the temperature of the indoor space. When the temperature rises above a predetermined threshold, the refrigerant regulator 113" is deactivated or electrically switched to reduce the flow volume of the refrigerant passing through the dehumidifying heat exchanger 90".

The second refrigerant stream entering the dehumidifying heat exchanger 90" is arranged to leave the dehumidifying heat exchanger 90" through the second dehumidifying port 92", and pass through a two-way valve 111", a drying filter 108, an expansion valve 109, and merge with the first refrigerant stream. The merged refrigerant streams enter the evaporator unit 40 for absorbing heat from the indoor space. The refrigerant then exits the evaporator unit 40 and passes through the fourth connecting port 604", the third connecting port 603", and finally goes back to the compressor unit 30.

It is important to mention at this stage that the window-type air conditioning system of the present invention does not need to install additional heat pumps for performing the dehumidifying function. A single system as described above is all that is necessary.

Figure 32:
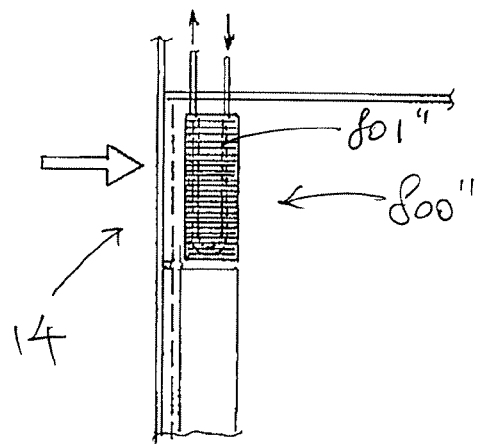
FIG. 32 is a schematic diagram of a heat pump cooling device of the window-type air conditioning system according to the second preferred embodiment of the present invention.
Figure 33:
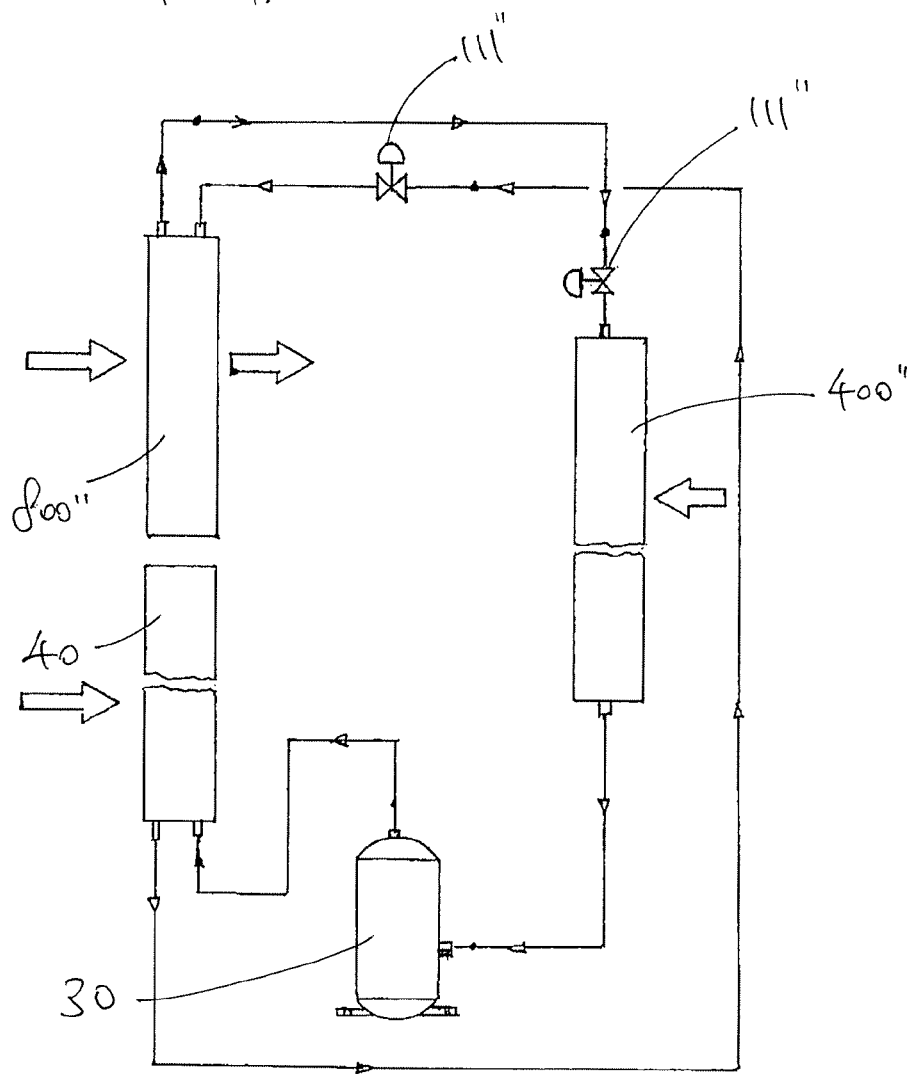
FIG. 33 is a simplified flow diagram of the heat pump cooling device of the window-type air conditioning system according to the second preferred embodiment of the present invention.

Referring to FIG. 32 and FIG. 33 of the drawings, the window-type air conditioning system comprises at least one heat pump cooling device 800" provided in the indoor compartment 11 of the outer housing 10 at a position adjacent to the side air inlet 14 so as to allow air from the ambient environment to pass through the heat pump cooling devices 800". The heat pump cooling device 800" is to be utilized when the window-type air conditioning system is operating in the heat pump mode for delivering heat to the indoor space.

As described above, the heat pump cooling device 800" comprises a heat exchanging pipe 801" connected between the outdoor heat exchanger 400" and the evaporator unit 40. The heat exchanging pipe 801" of the heat pump cooling device 800" is structurally identical to that of the heat exchanging pipes 55 of the water cooling unit 50 for performing heat exchange with the fresh air from the ambient environment.

The purpose of the heat pump cooling device 800" is to further lower the temperature of the refrigerant by utilizing ambient air which has very low temperature. As a result, the further reduction of the temperature of the refrigerant can be accomplished by minimum amount of additional energy. Moreover, the intake of ambient air to the indoor space substantially improves the air quality thereof.

The present invention, while illustrated and described in terms of a preferred embodiment and several alternatives, is not limited to the particular description contained in this specification. Additional alternative or equivalent components could also be used to practice the present invention.

What is claimed is:

1. A window-type air conditioning system comprising:
   an outer housing having an indoor compartment, an outdoor compartment, a water tank for storing a predetermined amount of cooling water, at least one outdoor air outlet, an outdoor air inlet, an indoor front air inlet, two side air inlets formed at two sides of said outer housing respectively and exposed to an ambient environment, an indoor air outlet, and a water inlet for allowing cooling water to be refilled in said water tank;
   a fan assembly which comprises an outdoor fan unit and an indoor fan unit movably accommodated in said outdoor compartment and said indoor compartment respectively;
   a compressor unit provided in said outdoor compartment;
   an evaporator unit provided in said indoor compartment, said evaporator unit having a front portion and two side portions extended from two ends of said front portion respectively, a longitudinal axis of said front portion being aligned with that of said indoor front air inlet, said side portions being located adjacent to said side air inlets respectively, whereby fresh ambient air is capable of being drawn from said ambient environment to said indoor space through said side air inlets and said side portions of said evaporator unit;
   a water cooling unit provided in said outdoor compartment, which comprises:
   a pumping device provided in said water tank for pumping said cooling water;
   a top water collection basin for collecting said cooling water from said pumping device;
   a fill material unit provided underneath said top water collection basin, wherein said cooling water collected in said top water collection basin is arranged to flow through said fill material unit;
   a bottom water collection basin provided underneath said fill material unit, said cooling water from said fill material unit being arranged to be collected in said bottom water collection basin; and
   at least one heat exchanging pipe provided in said bottom water collection basin and immersed in said cooling water, said cooling water collected in said bottom water collection basin being arranged to be guided to flow back into said top water collection basin, a predetermined amount of refrigerant being arranged to flow through said heat exchanging pipe in such a manner that said refrigerant is arranged to perform a heat exchanging process with said cooling water for lowering a temperature of said refrigerant, a predetermined amount of air being drawn from said outdoor air inlet to an air inlet side of said water cooling unit for performing heat exchange with said cooling water flowing through said fill material unit for lowering a temperature of said cooling water, said air having absorbed said heat from said cooling water being discharged out of said outer housing through said outdoor air outlet from an air outlet side of said water cooling unit; and
   a dehumidifying heat exchanger provided in said indoor compartment at a position behind said front portion of said evaporator unit so that air from said indoor space is guided to first pass through said evaporator unit and then said dehumidifying heat exchanger, said dehumidifying heat exchanger having a first dehumidifying port and a second dehumidifying port,
   said compressor unit having a compressor outlet connected to said water cooling unit and said dehumidifying heat exchanger, and a compressor inlet connected to said evaporator unit.

2. The window-type air conditioning system, as recited in claim 1, wherein said evaporator unit has a first evaporator port connected to said water cooling unit and said dehumidifying heat exchanger, and a second evaporator port connected to said compressor inlet of said compressor unit.

3. A window-type air conditioning system, comprising:
   an outer housing having an indoor compartment, an outdoor compartment, a water tank for storing a predetermined amount of cooling water, at least one outdoor air outlet, an outdoor air inlet, an indoor front air inlet, two side air inlets formed at two sides of said outer housing respectively and exposed to an ambient environment, an indoor air outlet, and a water inlet for allowing cooling water to be refilled in said water tank;
   a fan assembly which comprises an outdoor fan unit and an indoor fan unit movably accommodated in said outdoor compartment and said indoor compartment respectively;
   a compressor unit provided in said outdoor compartment;
   an evaporator unit provided in said indoor compartment, said evaporator unit having a front portion and two side portions extended from two ends of said front portion respectively, a longitudinal axis of said front portion being aligned with that of said indoor front air inlet, said side portions being located adjacent to said side air inlets respectively, whereby fresh ambient air is capable of being drawn from said ambient environment to said indoor space through said side air inlets and said side portions of said evaporator unit;

a water cooling unit provided in said outdoor compartment, which comprises:

a pumping device provided in said water tank for pumping said cooling water;

a top water collection basin for collecting said cooling water from said pumping device;

a fill material unit provided underneath said top water collection basin, wherein said cooling water collected in said top water collection basin is arranged to flow through said fill material unit;

a bottom water collection basin provided underneath said fill material unit, said cooling water from said fill material unit being arranged to be collected in said bottom water collection basin; and at least one heat exchanging pipe provided in said bottom water collection basin and immersed in said cooling water, said cooling water collected in said bottom water collection basin being arranged to be guided to flow back into said top water collection basin, a predetermined amount of refrigerant being arranged to flow through said heat exchanging pipe in such a manner that said refrigerant is arranged to perform a heat exchanging process with said cooling water for lowering a temperature of said refrigerant, a predetermined amount of air being drawn from said outdoor air inlet to an air inlet side of said water cooling unit for performing heat exchange with said cooling water flowing through said fill material unit for lowering a temperature of said cooling water, said air having absorbed said heat from said cooling water being discharged out of said outer housing through said outdoor air outlet from an air outlet side of said water cooling unit;

a dehumidifying heat exchanger provided in said indoor compartment at a position behind said front portion of said evaporator unit so that air from said indoor space is guided to first pass through said evaporator unit and then said dehumidifying heat exchanger, said dehumidifying heat exchanger having a first dehumidifying port and a second dehumidifying port;

an outdoor heat exchanger supported in said outdoor compartment of said outer casing, said outdoor heat exchanger having an L-shaped cross section and being extended at a rear portion and a side portion of said outer casing, said water cooling unit being positioned between said outdoor heat exchanger and said outdoor fan unit, said outdoor heat exchanger having a first heat exchanger port and a second heat exchanger port;

a first connecting valve and a second connecting valve both provided in said outdoor compartment of said outer casing, said first connecting valve and said second connecting valve being connected between said compressor unit, said outdoor heat exchanger, said water cooling unit, and said evaporator unit for guiding a flowing path of said refrigerant, wherein said first connecting valve having first through fourth connecting port, and being selectively operated between a normal mode and a switched mode, wherein when said first connecting valve is in said normal mode, said first connecting port is connected to said second connecting port while said third connecting port is connected to said fourth connecting port, wherein when said first connecting valve is in said switched mode, said first connecting port is connected to said fourth connecting port while said second connecting port is connected to said third connecting port, wherein said second connecting valve having fifth through eighth connecting port, and being selectively operated between a normal mode and a switched mode, wherein when said second connecting valve is in said normal mode, said fifth connecting port is connected to said sixth connecting port while said seventh connecting port is connected to said eighth connecting port, wherein when said second connecting valve is in said switched mode, said fifth connecting port is connected to said eighth connecting port while said sixth connecting port is connected to said seventh connecting port;

a heat pump cooling device which comprises a heat exchanging pipe connected between said outdoor heat exchanger and said evaporator unit, wherein said compressor unit has a compressor outlet connected to said first connecting port of said first connecting valve and said first dehumidifying port of said dehumidifying heat exchanger, and a compressor inlet connected to said third connecting port of said first connecting valve and said seventh connecting port of said second connecting valve.

4. The window-type air conditioning system, as recited in claim 3, wherein said second connecting port is connected to said fifth connecting port while said third connecting port is connected to said seventh connecting port, said fourth connecting port being connected to said first evaporator port of said evaporator unit.

5. The window-type air conditioning system, as recited in claim 4, wherein said sixth connecting port is connected to said water cooling unit, while said eighth connecting port is connected to said first heat exchanger port of said outdoor heat exchanger.

6. The window-type air conditioning system, as recited in claim 5, further comprising an energy efficient cooling unit connected between said water cooling unit and said evaporator unit, said energy efficient cooling unit comprising a cooling tank provided in said outer casing for storing a predetermined amount of water, and a cooling pipe immersed in said cooling tank, said cooling pipe having two longitudinal portions and a curved portion integrally connected between said two longitudinal portions, wherein said second heat exchanger port is connected to said water cooling unit, said energy efficient cooling unit, and said heat pump cooling device.

7. The window-type air conditioning system, as recited in claim 6, wherein said second evaporator port of said evaporator unit is connected to said energy efficient cooling unit, said heat pump cooling device, and said second dehumidifying port of said dehumidifying heat exchanger.

8. The window-type air conditioning system, as recited in claim 7, being configured to operate in at least one of an air conditioning mode, a heat pump mode, and a defrosting mode, wherein in said air conditioning mode, said first connecting valve and said second connecting valve are in said normal mode, said refrigerant being guided to sequentially flow through said compressor unit, said first connecting port, said second connecting port, said fifth connecting port, said sixth connecting port, said water cooling unit for releasing heat to said cooling unit, said energy efficient cooling unit for further releasing heat said water, said evaporator unit for absorbing heat from said indoor space, said fourth connecting port, said third connecting port, and back to said compressor unit.

9. The window-type air conditioning system, as recited in claim 8, wherein in said air conditioning mode, residual refrigerant in said outdoor heat exchanger is guided to leave said outdoor heat exchanger and sequentially flow through said eighth connecting port, said seventh connecting port, and back to said compressor unit.

10. The window-type air conditioning system, as recited in claim 9, wherein in said heat pump mode, said first connecting valve and said second connecting valve are in said switched mode, said refrigerant being guided to leave said compressor unit and bifurcated into a first refrigerant stream and a second refrigerant stream, said first refrigerant stream being guided to sequentially flow through said first connecting port, and said fourth connecting port, and said evaporator unit for releasing heat to said indoor space, said second refrigerant stream being guided to flow through said dehumidifying heat exchanger and merge with said first refrigerant stream leaving said evaporator unit, said merged refrigerant stream being guided to sequentially flow through said heat pump cooling device, said outdoor heat exchanger for absorbing heat from ambient environment, said eighth connecting port, said fifth connecting port, said second connecting port, said third connecting port, and back to said compressor unit.

11. The window-type air conditioning system, as recited in claim 10, wherein in said heat pump mode, residual refrigerant in said water cooling unit being guided to sequentially flow through said sixth connecting port and said seventh connecting port of said second connecting valve, and back to said compressor unit.

12. The window-type air conditioning system, as recited in claim 11, further comprising a switching arrangement electrically connected to said first connecting valve and said second connecting valve so as to switch said window-type air conditioning system to operate between an air-cooled status and a water-cooled status while said window-type air conditioning system is in said air conditioning mode.

13. The window-type air conditioning system, as recited in claim 12, wherein said switching arrangement comprises a mode selection switch, a status selection switch, a water level switch, a temperature sensor provided on said outer housing and is electrically connected to said status selection switch, and a water level sensor electrically connected to said water level switch.

14. The window-type air conditioning system, as recited in claim 13, wherein when said window-type air conditioning system is in said air-cooled status, said first connecting valve is configured to be in said normal mode, while said second connecting valve is configured in said switched mode, said refrigerant being guided to leave said compressor unit, and sequentially flow through said first connecting port, said second connecting port, said fifth connecting port, said eighth connecting port, said outdoor heat exchanger for releasing heat to ambient environment, said energy efficient cooling unit for further releasing heat to said water, said evaporator unit for absorbing heat from said indoor space, said fourth connecting port, said third connecting port, and back to said compressor unit.

15. The window-type air conditioning system, as recited in claim 14, wherein in said air-cooled status, residual refrigerant is guided to leave said water cooling unit and pass through said sixth connecting port, and said seventh connecting port and back to said compressor unit.

16. The window-type air conditioning system, as recited in claim 15, wherein in said defrosting mode, said first connecting valve is configured in said normal mode, while said second connecting valve is configured in said switched mode, said refrigerant being guided to sequentially flow through said compressor unit, said first connecting port, said second connecting port, said fifth connecting port, said eighth connecting port, said outdoor heat exchanger for releasing heat to said outdoor heat exchanger for defrosting thereof, said energy efficient cooling unit for releasing heat to said water, said evaporator unit for absorbing heat from said indoor space, said fourth connecting port, said third connecting port, and back to said compressor unit.

17. The window-type air conditioning system, as recited in claim 16, further comprising a refrigerant regulator connected between said compressor unit and said dehumidifying heat exchanger, and a humidity sensor provided on said outer housing for detecting a relative humidity in said indoor space, wherein when said humidity sensor detects that said air in said indoor space has a relative humidity which is above a predetermined threshold, said refrigerant regulator is activated for allowing a predetermined amount of refrigerant to flow between said compressor unit and said dehumidifying heat exchanger.

18. The window-type air conditioning system, as recited in claim 2, further comprising a plurality of separating members detachably mounted on said outer housing at a position adjacent to said side air inlets for guiding air to pass through said corresponding side portion of said evaporator unit when air is drawn to enter said outer housing through said side air inlets.

19. The window-type air conditioning system, as recited in claim 17, further comprising a plurality of separating members detachably mounted on said outer housing at a position adjacent to said side air inlets for guiding air to pass through said corresponding side portion of said evaporator unit when air is drawn to enter said outer housing through said side air inlets.

\* \* \* \* \*